(12) United States Patent
Matsumaru et al.

(10) Patent No.: US 6,633,578 B1
(45) Date of Patent: Oct. 14, 2003

(54) TRANSMISSION INTERFACE UNIT IN TRANSMISSION SYSTEM

(75) Inventors: Makoto Matsumaru, Saitama (JP); Kunihiro Minoshima, Saitama (JP); Hidemi Usuba, Saitama (JP); Sho Murakoshi, Saitama (JP); Kinya Ono, Saitama (JP); Seiichi Hasebe, Saitama (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/302,489

(22) Filed: Apr. 30, 1999

(30) Foreign Application Priority Data

May 7, 1998 (JP) .......................................... 10-140479

(51) Int. Cl.$^7$ .......................... H04L 12/40; G06F 13/00
(52) U.S. Cl. ...................... 370/419; 370/489; 710/104; 710/305
(58) Field of Search ................................ 370/419, 489, 370/508, 509; 710/305, 104

(56) References Cited

U.S. PATENT DOCUMENTS

| | | | | |
|---|---|---|---|---|
| 4,894,823 A | * | 1/1990 | Adelmann et al. | 370/216 |
| 5,699,519 A | * | 12/1997 | Shiobara | 709/235 |
| 6,034,732 A | * | 3/2000 | Hirota et al. | 348/441 |
| 6,061,411 A | * | 5/2000 | Wooten | 375/372 |
| 6,115,537 A | * | 9/2000 | Yamada et al. | 386/109 |
| 6,122,248 A | * | 9/2000 | Murakoshi et al. | 370/216 |
| 6,347,119 B2 | * | 2/2002 | Matsumura et al. | 375/240.28 |
| 6,373,821 B2 | * | 4/2002 | Staats | 370/252 |
| 6,405,275 B1 | * | 6/2002 | Morrow et al. | 710/305 |
| 2002/0015400 A1 | * | 2/2002 | Morinaga et al. | 370/345 |

FOREIGN PATENT DOCUMENTS

JP        10-032603        2/1998

OTHER PUBLICATIONS

"IEEE Standard for a High Performance Serial Bus"; Author: Microprocessor and Microcomputer Standards Committee of the IEEE Computer Society; published—1996.

* cited by examiner

Primary Examiner—Hassan Kizou
Assistant Examiner—Saba Tsegaye
(74) Attorney, Agent, or Firm—Sughrue Mion, PLLC

(57) ABSTRACT

A transmission interface unit in a transmission system wherein time series data is divided into data groups and a data packet comprising reproduction specification time data specifying the time at which each data piece in the data groups should be reproduced, added to the data groups is transmitted on a transmission bus in a time division manner. The reception interface unit has a cycle timer for counting the reference time of the home machine based on the reference time on the transmission bus, a generation section for generating the reproduction specification time data, an addition section for dividing the time series data into data groups, putting into packets, and adding the reproduction specification time data to the data in the packets, and a rewrite section for rewriting the reproduction specification time data. When the reference time on the transmission bus changes, the rewrite section rewrites the reproduction specification time data added to the data put into a packet before the reference time on the transmission bus changes.

12 Claims, 27 Drawing Sheets

CS: CYCLE START PACKET
I1, I2: ISOCHRONOUS PACKET

BUFFER IN SYT EXTRACTION SECTION 36

TO MATCH DETECTION CIRCUIT 34

TO MATCH DETECTION CIRCUIT 34

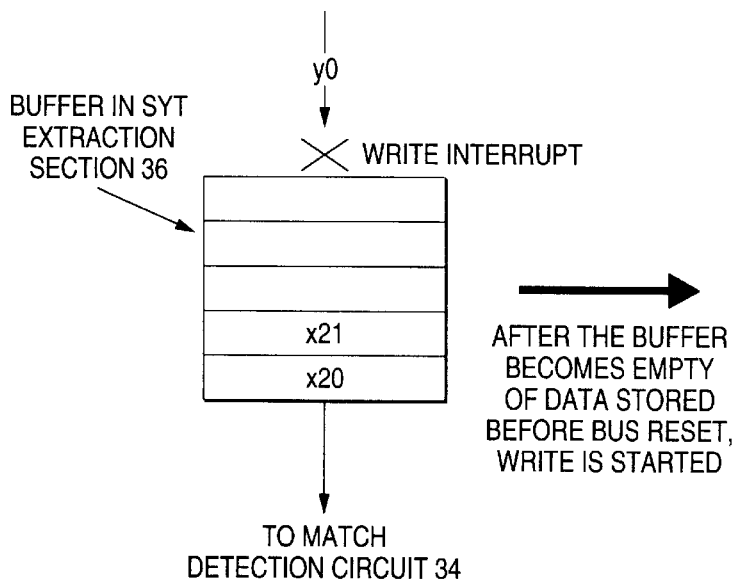
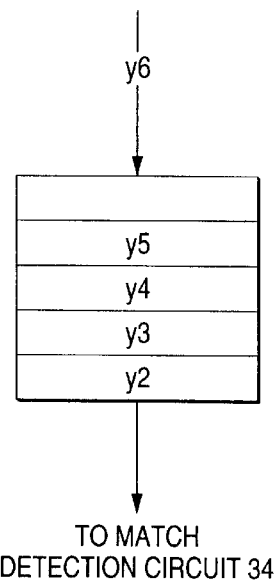
FIG. 21A / FIG. 21B
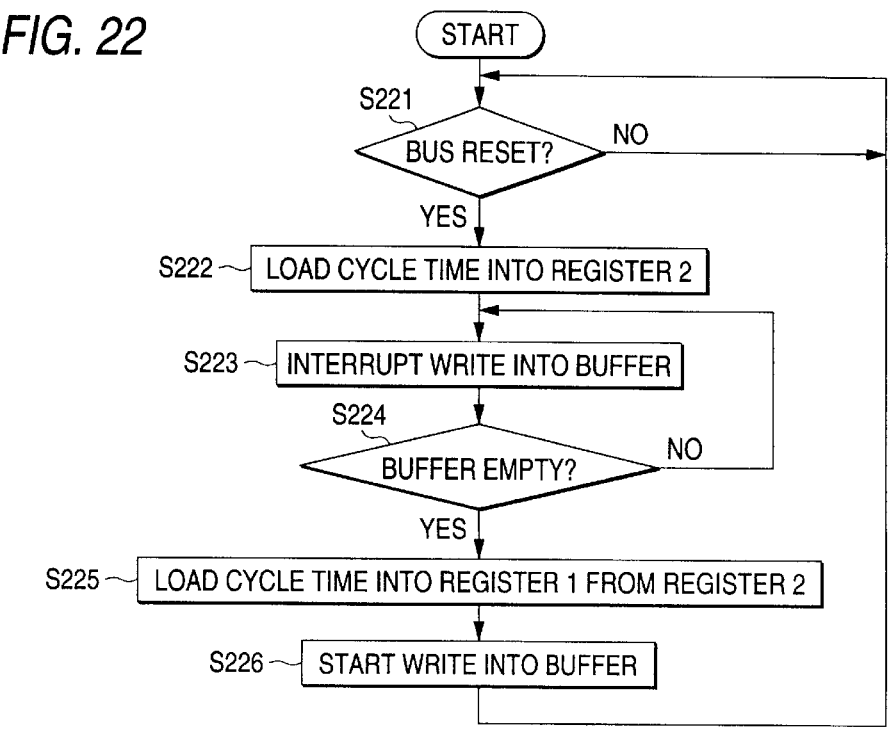
FIG. 22

BUFFER IN SYT EXTRACTION SECTION 36

TO MATCH DETECTION CIRCUIT 34

CLEAR SYT IN BUFFER

TO MATCH DETECTION CIRCUIT 34

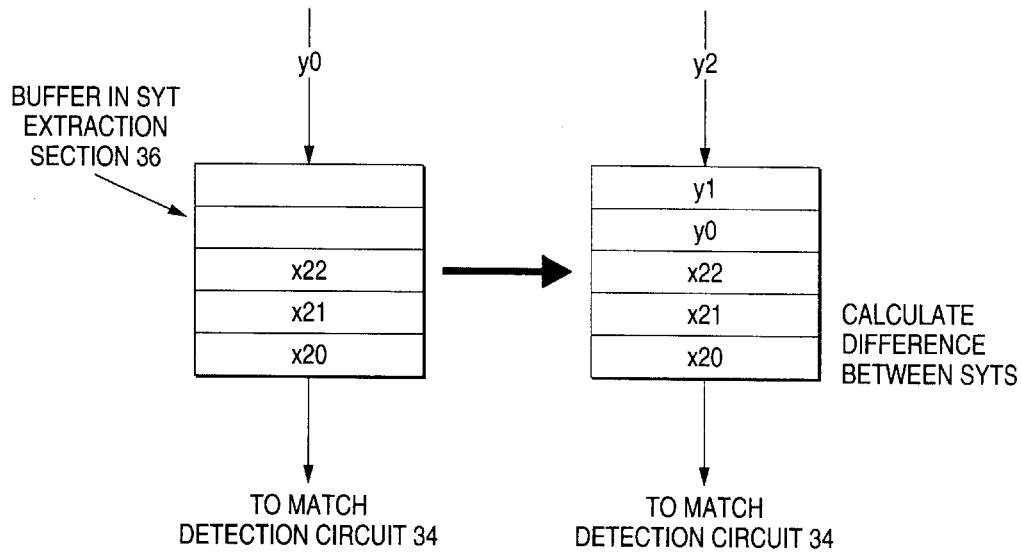
FIG. 33A
FIG. 33B
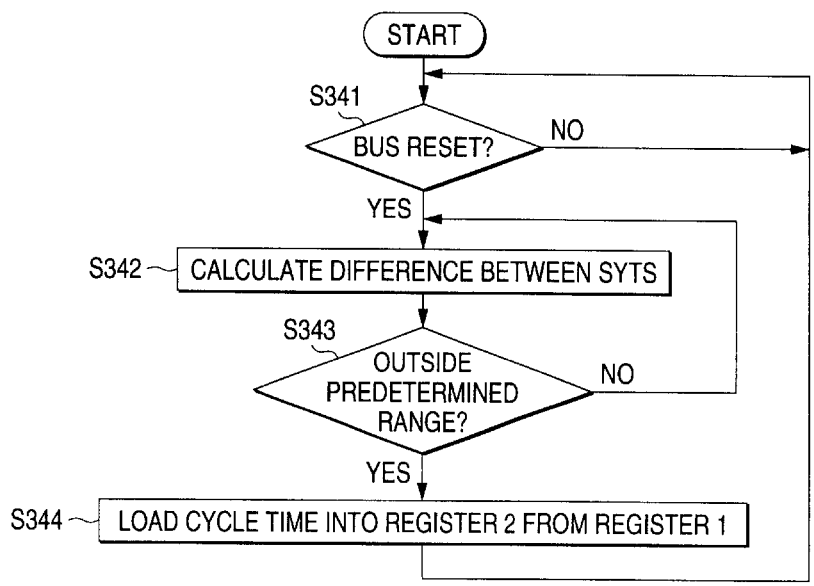
FIG. 34

TRANSMISSION INTERFACE UNIT IN TRANSMISSION SYSTEM

BACKGROUND OF THE INVENTION

1. Field of the Invention

This invention relates to a data transfer system for transferring time series digital data in a data packet at high speed.

2. Description of the Related Art

IEEE1394-1995 standard is proposed as an interface standard for putting time series digital data of audio signals, video signals, etc., into a data packet and transferring the data packet at high speed between electric machines such as audio machines, video machines, computers, etc.

However, in a data transfer system based on the IEEE1394-1995 standard, it is conceivable that the data to be transmitted becomes past data from the reference time at the transmission time in a transmitter, for example, because of change in the reference time in the system, a malfunction, etc., and in the party receiving the data, digital data cannot be reproduced at proper timing from the later received data packet over a considerable period of time.

SUMMARY OF THE INVENTION

It is therefore an object of the invention to provide a unit, when the data to be transmitted becomes past data from the reference time because of change in the reference time, a malfunction, etc., the unit for correcting the data to data based on the current time and transmitting the corrected data.

It is another object of the invention to provide a unit for enabling a receiver to deal with data for which the problem cannot be solved in a transmitter.

According to a first aspect of the invention, there is provided a transmission interface unit in a transmission system wherein time series data is divided into data groups and a data packet comprising reproduction specification time data specifying the time at which each data piece in the data groups should be reproduced, added to the data groups is transmitted on a transmission bus in a time division manner, the transmission interface unit comprising a cycle timer for counting the reference time of the home machine based on the reference time on the transmission bus, generation means for generating the reproduction specification time data, and addition means for dividing the time series data into data groups, putting into packets, and adding the reproduction specification time data to the data in the packets, characterized by rewrite means for rewriting the reproduction specification time data generated by the generation means when the reference time on the transmission bus changes.

In a second aspect of the invention, the transmission interface unit as set forth in the first aspect of the invention further includes determination means for determining whether the reproduction specification time data generated by the generation means is reproduction specification time data generated before or after the reference time on the transmission bus changes and supplying the reproduction specification time data generated before the reference time on the transmission bus changes to the rewrite means based on the determination result.

In a third aspect of the invention, in the transmission interface unit as set forth in the first or second aspect of the invention, the cycle timer comprises at least two registers each for temporarily retaining a reference time transmitted on the transmission bus, at least the reference time of the home machine set before the reference time on the transmission bus changes and the reference time of the home machine set after the reference time on the transmission bus changes are retained in the registers, when the reference time on the transmission bus changes, the cycle timer calculates a difference between the reference times retained in the registers and transmits the difference to the rewrite means, and the rewrite means rewrites the reproduction specification time data based on the difference.

In a fourth aspect of the invention, in the transmission interface unit as set forth in the second or third aspect of the invention, the determination means and the rewrite means are at the stage following the addition means.

According to the first aspect of the invention, when the reference time on the transmission bus changes, the rewrite means rewrites the reproduction specification time data generated before the reference time on the transmission bus changes. Thus, when the data to be transmitted onto the bus becomes past data from the reference time, the data can be corrected to data based on the current time and the corrected data can be transmitted.

According to the second aspect of the invention, the determination means determines whether the reproduction specification time data is reproduction specification time data generated before or after the reference time on the transmission bus changes and can supply the reproduction specification time data put into a packet before the reference time on the transmission bus changes to the rewrite means based on the determination result. Thus, only the data which is to be transmitted onto the bus and is past data from the reference time can be appropriately corrected to data based on the current time and the corrected data can be transmitted.

According to the third aspect of the invention, when the reference time on the transmission bus changes, the cycle timer calculates a difference between the reference times of the home machine retained in the registers and transmits the difference to the rewrite means, and the rewrite means can rewrite the reproduction specification time data based on the difference. Thus, only the data which is to be transmitted onto the bus and is past data from the reference time can be appropriately corrected to data based on the current time and the corrected data can be transmitted.

According to the fourth aspect of the invention, the determination means and the rewrite means are at the stage following the addition means, thus making it possible to correct the reproduction specification time data just before the data is transmitted onto the transmission bus.

BRIEF DESCRIPTION OF THE DRAWINGS

In the accompanying drawings:

FIGS. 21A and 21B are schematic drawings to show a third embodiment of the invention;

FIG. 22 is a flowchart to show the third embodiment of the invention;

FIGS. 33A and 33B are schematic drawings to show a sixth embodiment of the invention;

FIG. 34 is a flowchart to show the sixth embodiment of the invention; and

DETAILED DESCRIPTION OF THE INVENTION

Referring now to the accompanying drawings, there are shown preferred embodiments of the invention.

Figure 1:
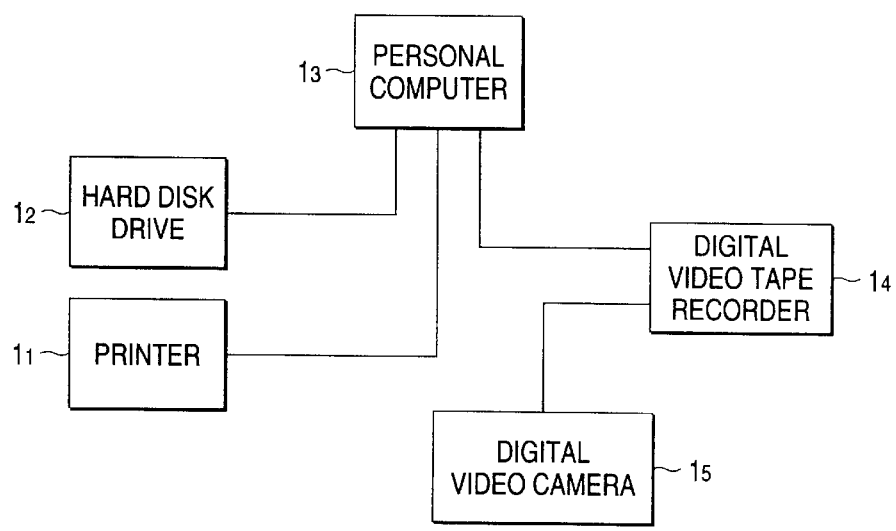
FIG. 1 is a drawing to show electric machines connected by a high-speed serial data transfer interface.

FIG. 1 shows a data transfer system incorporating the invention. The data transfer system comprises a high-speed serial data transfer interface based on the IEEE1394-1995 standard, wherein a plurality of electric machines $1_1$ to $1_5$ are detachably connected using cables and connectors in a daisy chain manner and a branch manner. The electric machines $1_1$ to $1_5$ refer to machines for inputting or outputting digital data, such as digital video tape recorders, digital video disc players, personal computers, digital video cameras, hard disk drives, scanners, and printers. That is, the electric machines include not only personal computers and peripheral machines connected thereto, but also household electric products for inputting or outputting digital data.

If each of the electric machines $1_1$ to $1_5$ is connected only at the termination of the daisy chain, it may comprise one connector jack; a machine enabling the daisy chain manner comprises two connector jacks and a machine enabling the branch manner comprises three or more connector jacks. A connector plug connected to a connector jack is provided at either end of each cable. A path provided by the cables for connecting the machines is a data transfer bus.

Subsequently, a data transfer protocol of the IEEE1394-1995 standard will be discussed. In this protocol, electric machines are referred to as nodes, which are given node IDs for discriminating the electric machines from each other. The node is either a branch node or a leaf node. That is, the branch node is a node connected to two or more nodes and the leaf node is a termination node connected only to one node.

In a state in which a number of nodes are connected, a bus reset signal is generated when power is turned on, when an additional node is connected to the bus, or when any node is disconnected from the bus. After the bus is reset, a root node is determined among the nodes.

First, a root node determination method will be discussed in detail.

Each of the nodes connected on the bus determines which of branch and leaf nodes the home machine is, and detects topology of the nodes as information.

The node which determines that the home machine is a leaf node sends a signal parent notify indicating a notification from a child node to a parent node to a branch node. The node which receives the signal parent notify returns a signal child notify indicating a notification from a parent node to a child node to the leaf node, whereby the parent-child relationship between the nodes containing the leaf node is determined. After this, since neither the signal parent notify nor the signal child notify is transferred between branch nodes, the branch nodes recognize that a parent-child relationship is not determined, and each sends a signal parent notify to the other. When each of the two branch nodes sending the signal to the other judges reception of the signal parent notify, the branch nodes set different times individually. One branch node in which the setup time has elapsed first sends a signal parent notify to the other. Since the other receives the signal parent notify from one branch node before the expiration of the setup time, the parent-child relationship between the two branch nodes is determined. The parent node between two branch nodes with their parent-child relationship thus last determined becomes the root node.

Figure 2:
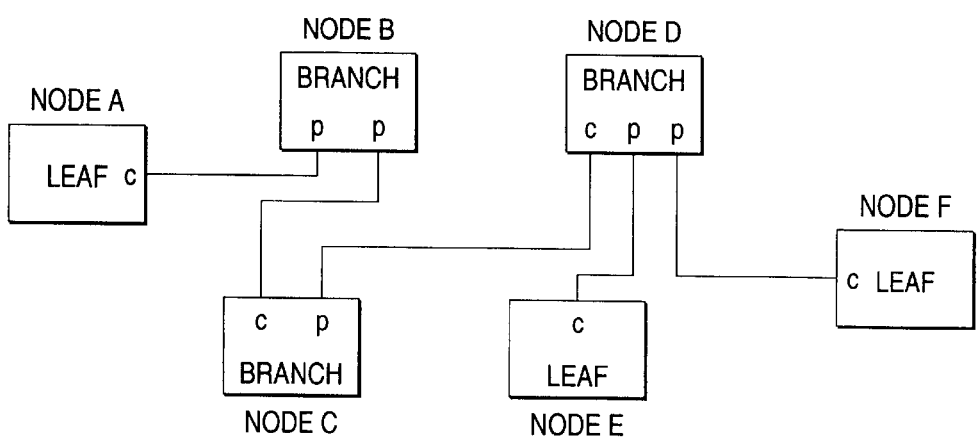
FIG. 2 is a drawing to describe a root node determination method in topology in which nodes A to F are connected.

For example, in topology in which nodes A to F are connected as shown in FIG. 2, the leaf nodes A, E, and F are first determined to be child nodes. A port of each of the leaf nodes A, E, and F corresponds to a child node as indicated by c, and one port of the branch node B and two ports of the branch node D to which the leaf nodes are connected correspond to parent nodes as indicated by p.

Next, between the branch nodes C and D, the node C has two undetermined ports and thus the branch node D first sends parent notify to the branch node C, because the node which has one undetermined port shall first send parent notify. Therefore, at this point in time, the remaining one port of the branch node D corresponds to child node c and one port of the branch node C corresponds to parent node p.

Between the nodes B and C, the above-described relationship is also set, namely, the node B has one undetermined port and the node C does not have any determined port. However, the example assumes that the parent-child relationship between the nodes C and D is determined before the parent-child relationship between the nodes A and B is determined.

Thus, last, between the branch nodes B and C, both the nodes have one undetermined port and each sends parent notify to the other. At this time, as described above, when each of the two branch nodes sending the signal to the other judges reception of parent notify, the branch nodes set different times individually. In the example, the branch node C, which first reaches the setup time, again sends parent notify to the branch node B. Since the branch node B receives parent notify from one branch node before the expiration of the setup time, the parent-child relationship between the two branch nodes is determined. That is, the other port of the branch node C corresponds to child node c and the port of the branch node B corresponds to parent node p. The node B which becomes the parent node between the two branch nodes with their parent-child relationship thus last determined becomes the root node.

Next, a method of giving node IDs to nodes will be discussed in detail.

First, the root node sends a signal for giving a node ID to each node. In this process, the node IDs starting at the lowest number (node number 0) are set starting at a leaf node at the termination in the port number order of the ports to which child nodes are connected. The root node is assigned the node ID of the highest node number.

Figure 3:
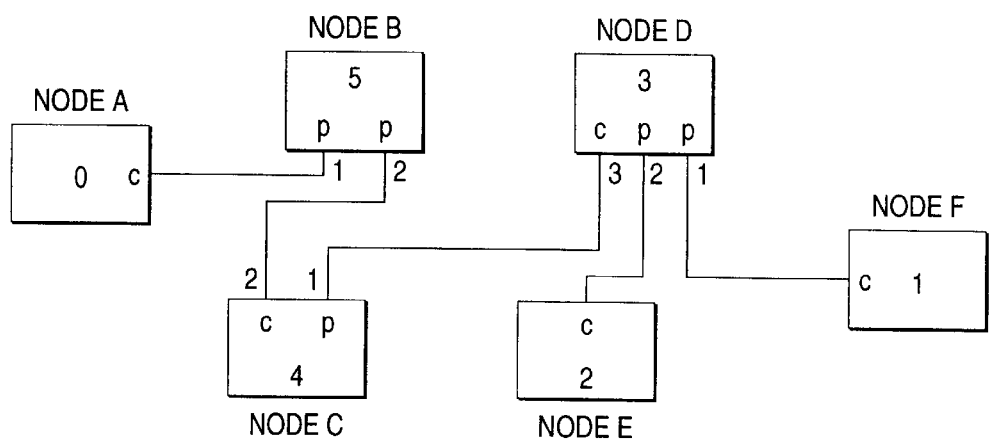
FIG. 3 is a drawing to describe a procedure of giving node IDs to nodes.

For example, in the topology in FIG. 2, node IDs are given as shown in FIG. 3. The node ID giving method is as follows: First, the node B, which is the root node, sends a signal grant for giving a node ID number to the node A connected to the port assigned the lowest port number in the machine of the node B. In FIG. 3, the numbers indicated near the bus connection terminals are port numbers. After receiving the signal grant, the node A, which is a leaf node, is assigned the node ID number, then returns an acknowledge signal indicating that the number is assigned to the parent node. After this, the node A sends the node ID number of the home machine (ID=0) to all nodes.

Upon reception of the ID number, every node increments a node counter of the home machine (ID counter=0).

Next, the root node B sends a signal grant for giving a node ID number to the node C connected to the port assigned the second lowest port number in the machine of the node B. The node C, which is not a leaf node, sends a signal grant for giving node ID number to the node D connected to the port assigned the lowest port number in the machine of the node C. The node D, which is not a leaf node either, sends a signal grant for giving node ID number to the node F connected to the port assigned the lowest port number in the machine of the node D. After receiving the grant signal, the node F, which is a leaf node, is assigned the node ID number, then returns an acknowledge signal indicating that the number is assigned to the parent node D. After this, the node F sends the node ID number of the home machine (ID=1) to all nodes.

Upon reception of the ID number, every node increments the node counter of the home machine (ID counter=1).

Next, the node D sends a signal grant for giving node ID number to the node E connected to the port assigned the second lowest port number in the machine of the node D. Hereinafter, the node ID numbers of the machines will be given in the above-described order, as in FIG. 3.

Upon completion of giving the node IDs, a bus manager and an isochronous resource manager are selected from among nodes; the bus manager performs power control and topology mapping and speed mapping management and the isochronous resource manager performs isochronous band control and isochronous channel control. This topic will not be discussed in detail here.

Figure 4:
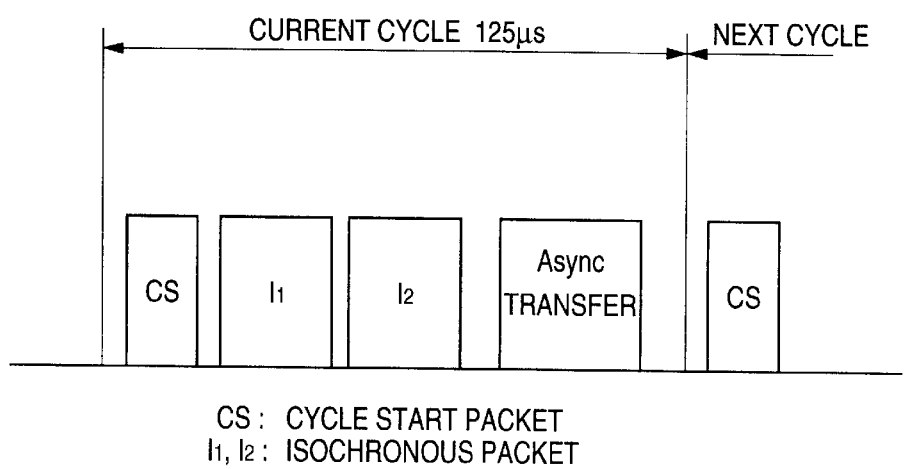
FIG. 4 is a drawing to show a packet composition in a cycle.

Isochronous transfer and asynchronous transfer are executed as data transfer. The isochronous transfer is executed for transferring synchronous data which needs to be transmitted periodically and the asynchronous transfer is executed for transferring asynchronous data. One cycle of data transfer is 125 $\mu$sec; in each cycle, a cycle start packet CS, isochronous packets $I_1$ and $I_2$, and an asynchronous packet (Async transfer) are positioned in order as shown in FIG. 4. The cycle start packet CS is transferred from a cycle master node (for example, the root node) to all nodes and indicates the start of the data transfer cycle.

Figure 5:
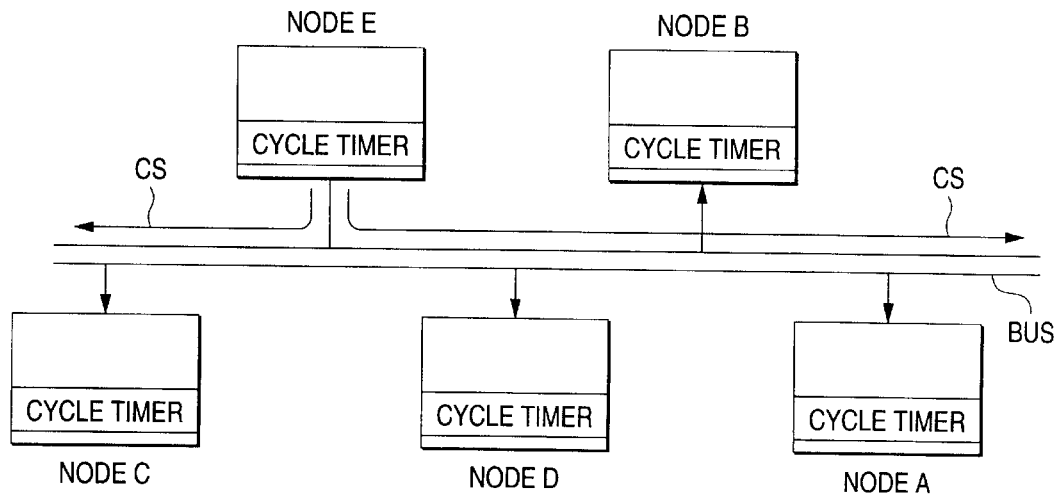
FIG. 5 is a drawing to show transfer of a cycle start packet CS.

Assuming that five nodes A to E are connected to a bus based on the IEEE1394-1995 standard, for example, as shown in FIG. 5, each of the nodes A–E comprises a cycle timer for counting at a frequency of 24.576 MHz and providing a time value, and transmits or receives data at the count timing of the cycle timer. If the node E is the cycle master node, it sends a cycle start packet CS onto the bus for supplying the cycle start packet CS to the nodes A to D every 125 $\mu$s. The cycle start packet CS indicates the time value of the cycle timer of the node E and each of the nodes A–D receives the cycle start packet CS and then makes the time value of the cycle timer of the node equal to the time value of the cycle timer of the node E indicated in the received cycle start packet CS (reference time), whereby the data transmission/reception operation timings of all nodes A to E connected to the same bus are synchronized.

Figure 6:
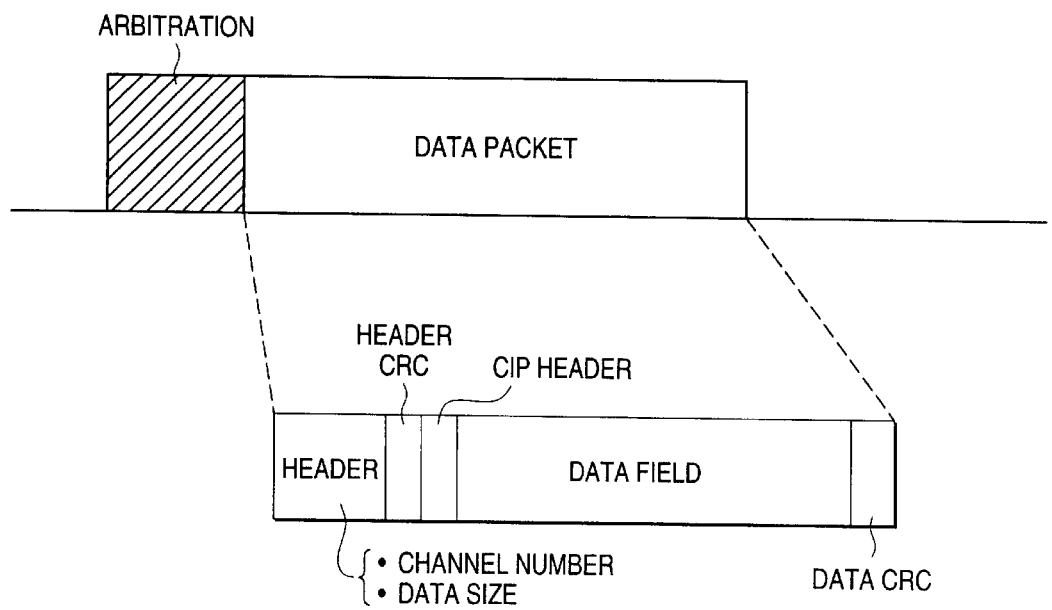
FIG. 6 is a drawing to show the structure of an isochronous packet.

The isochronous packet is an isochronous transfer packet and the units of isochronous packets transferred in one isochronous packet cycle are called channels. In FIG. 4, the packets $I_1$ an $I_2$ of two channels are shown; the number of packets is set for each cycle and packets of channels are time division multiplexed. A node for transferring data in isochronous packets can send a data packet once every 125 $\mu$s if it previously executes a reservation procedure and gets a channel. Specifically, as shown in FIG. 6, the isochronous packet consists of arbitration and a data packet. The arbitration is data for asking the root node for the bus use right and getting use permission before data transfer. If any node gets use permission, immediately the root node supplies a signal indicating the fact to each node. If user permission is gotten, the data packet following the arbitration is sent. It has a header, header CRC, a CIP header, a data field, and data CRC in time sequence. The header contains a channel number indicating the type of data transferred in the isochronous packet, a data size indicating the time length of the data, etc., as information. The channel numbers are 0 to 63.

Figure 7:
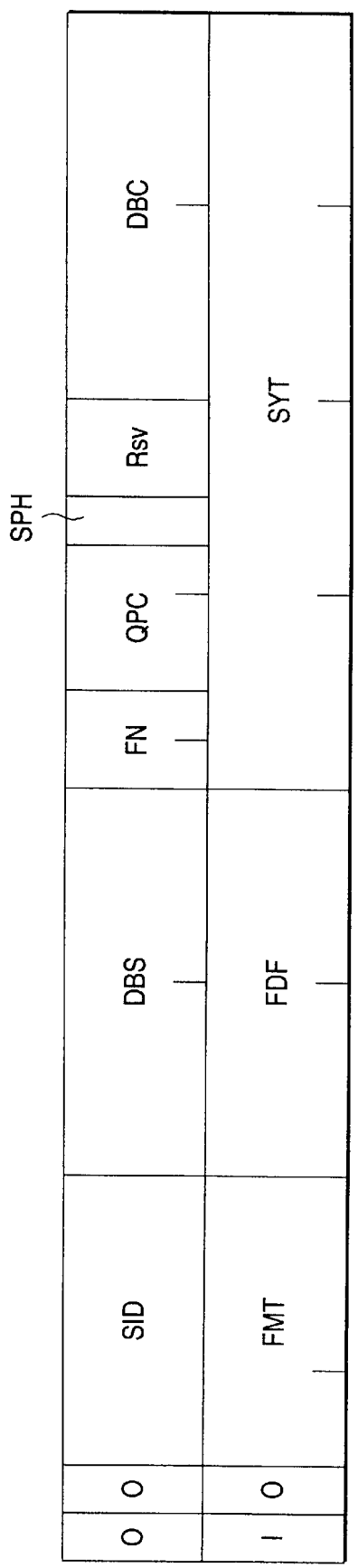
FIG. 7 is a drawing to show the format of a CIP header.

The format of the CIP header is as shown in FIG. 7. It will be discussed briefly. SID is a field for giving a transmitter ID number. DBS is the size of one sample data piece (data block). FN, QPC, and SPH are fields required for sending video data such as MPEG data, for example. FN is a numeric value indicating how many data blocks a source packet is divided into to convert the source packet into IEEE1394 packet, QPC is a value indicating the number of dummy quadrats added to set the size of the source packet to a DBS multiple (one quadrate is four bytes), and SPH is a field for giving one to the data packet containing a source packet header. Rsv is a reserved field and DBC is a field for giving consecutive number of sample data. The DBC indicated in the CIP header is the number of the first sample data in data packet.

Next, FMT is a format ID and is a field given in response to a data protocol; for example, for A&M (Audio/Music) protocol, A&M protocol format information is given. FDF is a field pursuant to the FMT; for example, for the A&M (Audio/Music) protocol, the sampling frequency of each data, etc., is given.

SYT indicates the demodulating time of the packet data in the receiving party and is time stamp data (reproduction specification time data). This reproduction specification time data SYT is made up of the low-order 16 bits of the CIP header. The high-order four bits of the low-order 16 bits are called a cycle count for counting every Iso cycle (125 µs) and the low-order 12 bits are called a cycle offset for counting at a clock of 24.576 MHz.

Figure 8:
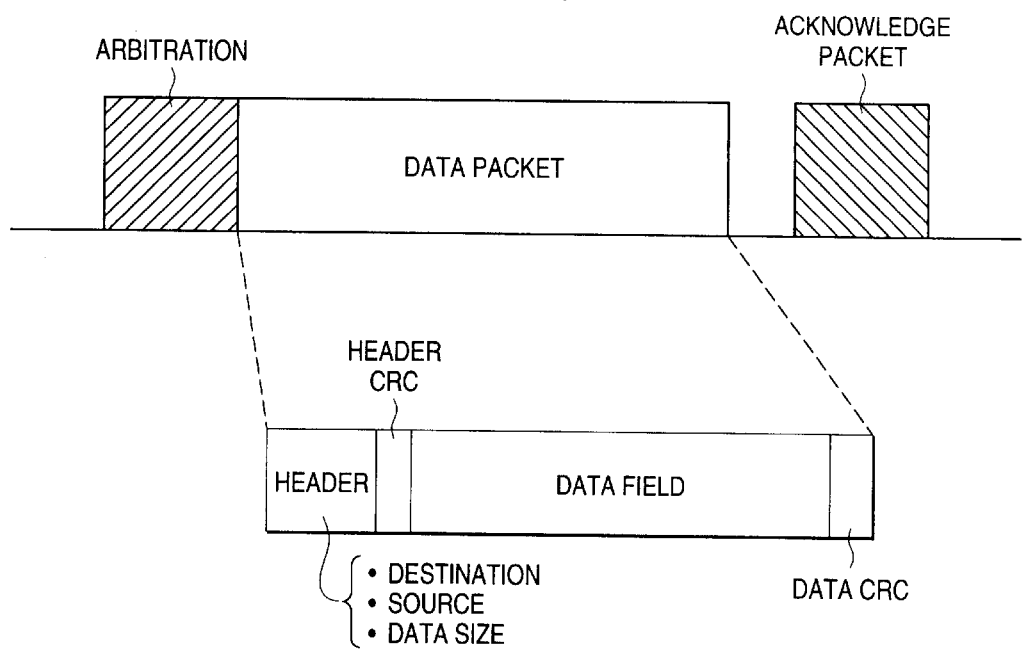
FIG. 8 is a drawing to show the structure of an asynchronous packet.

The asynchronous packet is a packet for transferring data with a transfer destination specified. The transfer destination is a specific node or all nodes on the bus. Specifically, as shown in FIG. 8, the asynchronous packet consists of arbitration, a data packet, and an acknowledge packet. The arbitration is data for asking the root node for the bus use right and getting use permission before data transfer. The data packet has a header, header CRC, a data field, and data CRC in time sequence. The header contains the node ID of the destination of the data transferred in the asynchronous packet, the node ID of the source, a data size indicating the time length of the data, etc., as information. The acknowledge packet is a packet returned to the source node by the destination node which receives the data transferred in the asynchronous packet and acknowledges the data reception.

Figure 9:
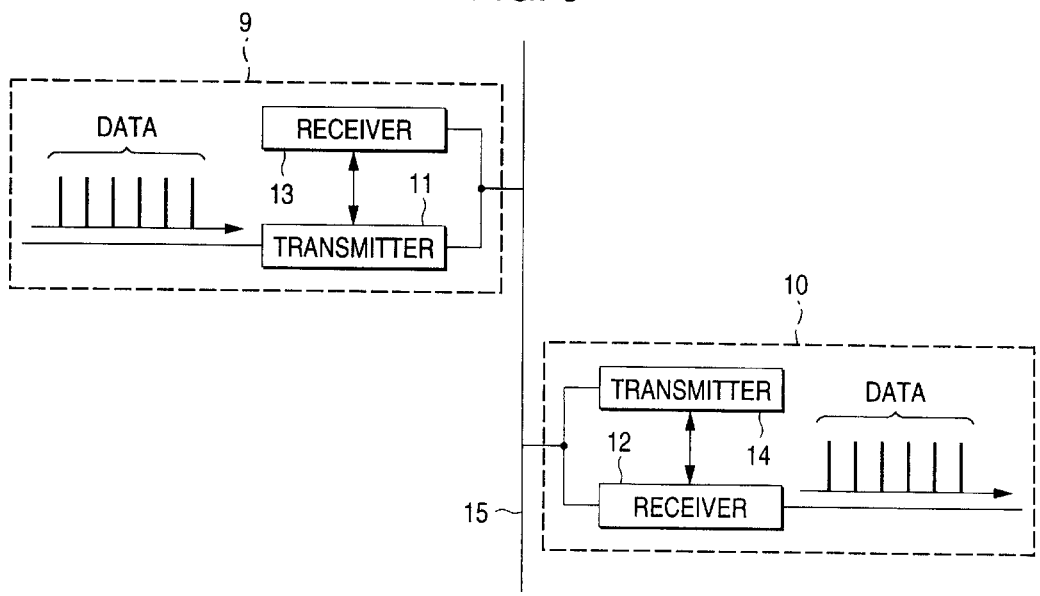
FIG. 9 is a drawing to show a connection state of electric machines containing transmitters and receivers.

Next, an audio data transfer method in an isochronous packet will be discussed. As shown schematically in FIG. 9, assume that audio data DATA of time series digital data with sampling frequency fs, for example, 44.1 kHz is supplied from a transmitter 11 in one electric machine 9 to a receiver 12 in another electric machine 10 via a bus 15 based on the IEEE1394-1995 standard. The electric machine 9 contains a receiver 13 similar to the receiver 12 and the electric machine 10 contains a transmitter 14 similar to the transmitter 11.

Figure 10:
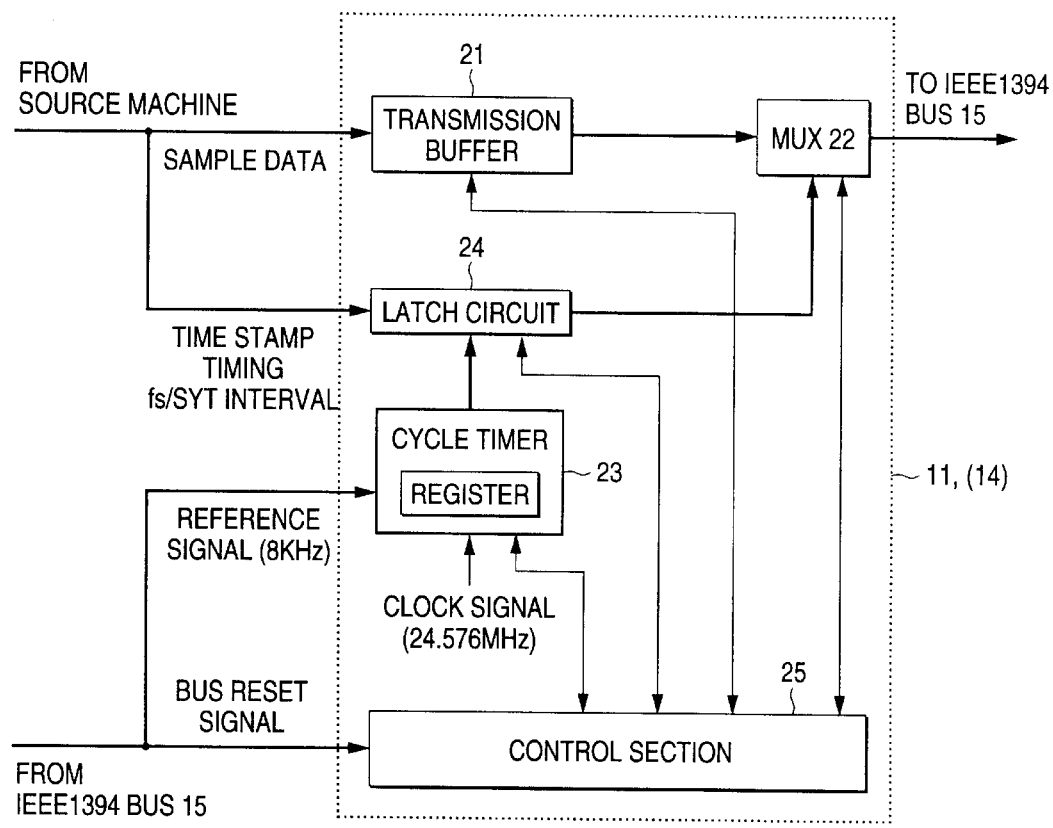
FIG. 10 is a block diagram to show the configuration of the transmitter.

In the transmitter 11 (14), as shown in FIG. 10, sample data of digital data is stored in a transmission buffer 21 in sequence. The stored data is put into a data packet by an MUX (multiplexer) 22, then output to the bus 15.

On the other hand, a 24.576-MHz clock signal is supplied to a cycle timer 23 made of a register and an 8-kHz reference signal (signal on which the reference time is based) is also supplied from the cycle master node to the cycle timer 23. All nodes set the time based on the reference time.

FIG. 10 shows the configuration of any node other than the cycle master node; in the cycle master node, the reference time is generated according to the clock of the home machine and thus the 8-kHz reference signal is not supplied to the cycle master node.

The cycle timer 23 counts the clock signal from the value indicated by the reference signal and supplies the count to a latch circuit 24 as a time value. A time stamp timing signal fs/SYT INTERVAL is supplied to the latch circuit 24 periodically. It is a signal generated by means (not shown) and indicating the timing for adding a time stamp, namely, time information to sample data (data block) and is a frequency found by sampling frequency fs/sample interval SYT INTERVAL.

The sample interval SYT INTERVAL is a sample interval at which a time stamp (SYT) is added to the sample data; for example, it is eight. Therefore, the latch circuit 24 retains the time value of the cycle timer 23 when the time stamp timing signal fs/SYT INTERVAL is supplied. Transfer delay time $T_D$ described later is added to the retained time value and the result is supplied to the MUX 22 and is added to sample data at the sample interval SYT INTERVAL at conversion to a packet. Thus, the sample data having the time value every sample interval SYT INTERVAL is sent to the bus 15 as a data packet. An adder for adding the transfer delay time $T_D$ to output of the latch circuit 24 is provided although it is not shown.

The transmission buffer 21, the MUX 22, the cycle timer 23, and the latch circuit 24 are controlled by a control section 25.

The control section 25 receives a bus reset signal sent on the bus and then sends a predetermined control signal described later to each circuit.

Figure 11:
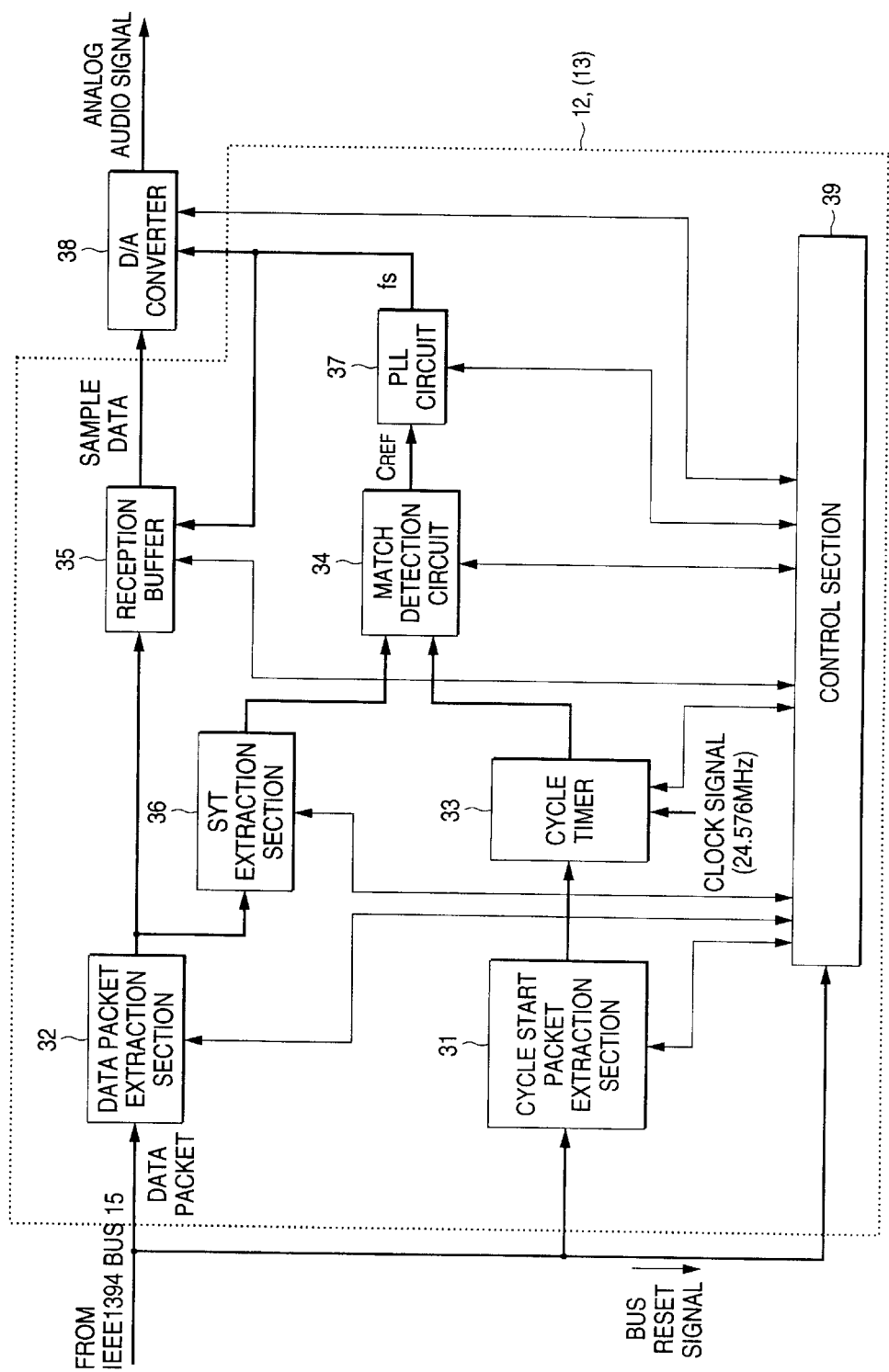
FIG. 11 is a block diagram to show the configuration of the receiver.

In the receiver 12 (13), as shown in FIG. 11, a data packet from the bus 15 is supplied to a cycle start packet extraction section 31 and a data packet extraction section 32 for an isochronous packet. From the data packet transferred via the bus 15, the cycle start packet extraction section 31 extracts a cycle start packet CS and the data packet extraction section 32 extracts an isochronous packet. The extracted cycle start packet CS is supplied to a cycle timer 33 and the time value indicated in the cycle start packet CS is set in the cycle timer 33, which then counts the 24.576-MHz clock signal from the setup time value and outputs the count to a match detection circuit 34 as cycle time (reference time) Tc.

On the other hand, the isochronous packet extracted by the data packet extraction section 32 is stored in a reception buffer 35 and the SYT contained in the CIP header in the isochronous packet is extracted by an SYT extraction section 36 and is output to the match detection circuit 34, which then compares the cycle time Tc supplied from the cycle timer 33 with the SYT supplied from the SYT extraction section 36. When the time values match, the match detection circuit 34 outputs a reproduction reference clock signal $C_{REF}$ to a PLL circuit 37, which then generates a reproduction sampling clock signal fs in phase synchronization with the reproduction reference clock signal $C_{REF}$ and supplies the reproduction sampling clock signal fs to the reception buffer 35 and a D/A converter 38. The reception buffer 35 separates sample data in the stored data packet in sample data units in synchronization with the reproduction sampling clock signal fs and outputs. The D/A converter 38 converts the sample data output from the reception buffer 35 into an analog audio signal in synchronization with the reproduction sampling clock signal fs.

A control section 39 is provided for controlling the circuits in batch.

A bus reset signal transmitted on the bus is received at the control section 39.

The data packet transfer method will be furthermore discussed. If the cycle time on the bus 15 is 5, 6, 7 . . . (FIG. 12A, cycle timer) and a time stamp timing signal fs/SYT INTERVAL is generated like a signal waveform shown in FIG. 12C in the transmitter 11 (14), the time values T1, T2, T3, . . . on the rising edges of the time stamp timing signal fs/SYT INTERVAL correspond to sample data a, b, c . . . at the point in time.

Figure 12:
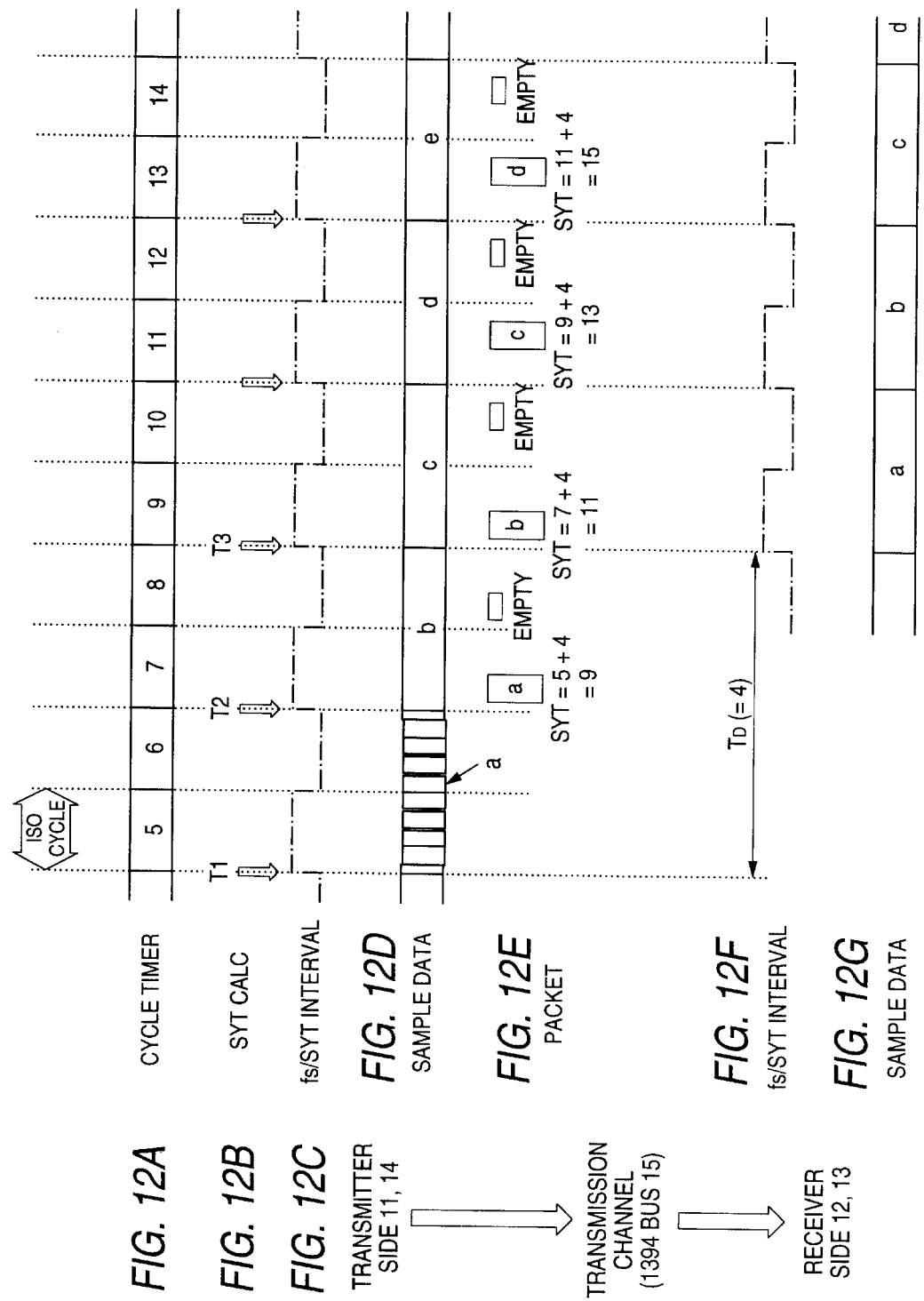
FIGS. 12A to 12G is timing charts to describe data packet transfer.

That is, as shown in FIG. 12D, the sample data string is put into a packet, for example, in eight sample units (only sample data string a is shown) every 125 μsec (FIG. 12E) and the time value T1, T2, T3, . . . of the sample data positioned on the rising edge of the time stamp timing signal fs/SYT INTERVAL in the sample data string is added to the CIP header as SYT. The sample data interval at which the time value is added becomes the sample interval SYT INTERVAL (in the example in FIGS. 12A to 12G, 8). The time value T1, T2, T3, . . . is data indicating the reproduction output time in the receiving party of the corresponding sample data and the transfer delay time $T_D$ is added to the current time value of the cycle time of the transmitter as described above.

After this, in the next cycle to the 125-μsec cycle in which conversion to a packet is executed, the data packet is sent onto the bus, as shown in FIG. 12E.

In the receiver 12 (13), the isochronous packet ISO sent from the transmitter 11 (14) is extracted, then is stored in the reception buffer 35.

For example, when the time value of the cycle timer shown in FIG. 12A becomes cycle time=9, in the receiving party, the sample data a is output from the reception buffer 35, as shown in FIG. 12G, in synchronization with the reproduction sampling clock signal fs. When the time value of the cycle timer 33 of the receiver 12 becomes cycle time=11, the sample data b is output from the reception buffer 35 in synchronization with the reproduction sampling clock signal fs. Such operation is repeated as long as the reproduction reference clock signal $C_{REF}$ is provided, so that data transfer is enabled.

Thus, in the receiving party, the transferred data is stored in the buffer and when the SYT (reproduction specification time data) of the reception data matches the time value Tc (reference time) output from the cycle timer in the receiving party, the data is processed.

However, for example, if a new bus is connected to the bus on which isochronous transfer is executed, bus reset occurs, and at the time, there is a possibility that a machine on the new connected bus will become the cycle master node and the cycle time in the former transmission channel will change. At this time, there is a possibility that the transmitter in the transmission channel where the reference time on the transmission bus changes will transmit a packet containing SYT calculated with the reference time before the bus reset. In the node receiving the packet, at the worst, the SYT (reproduction specification time data) of the reception data may not match the time value Tc output from the cycle timer in the receiving party or it may take much time until they match; for example, there is a possibility that the buffer in the receiving party will overflow, making it impossible to perform normal reception data processing.

Figure 13:
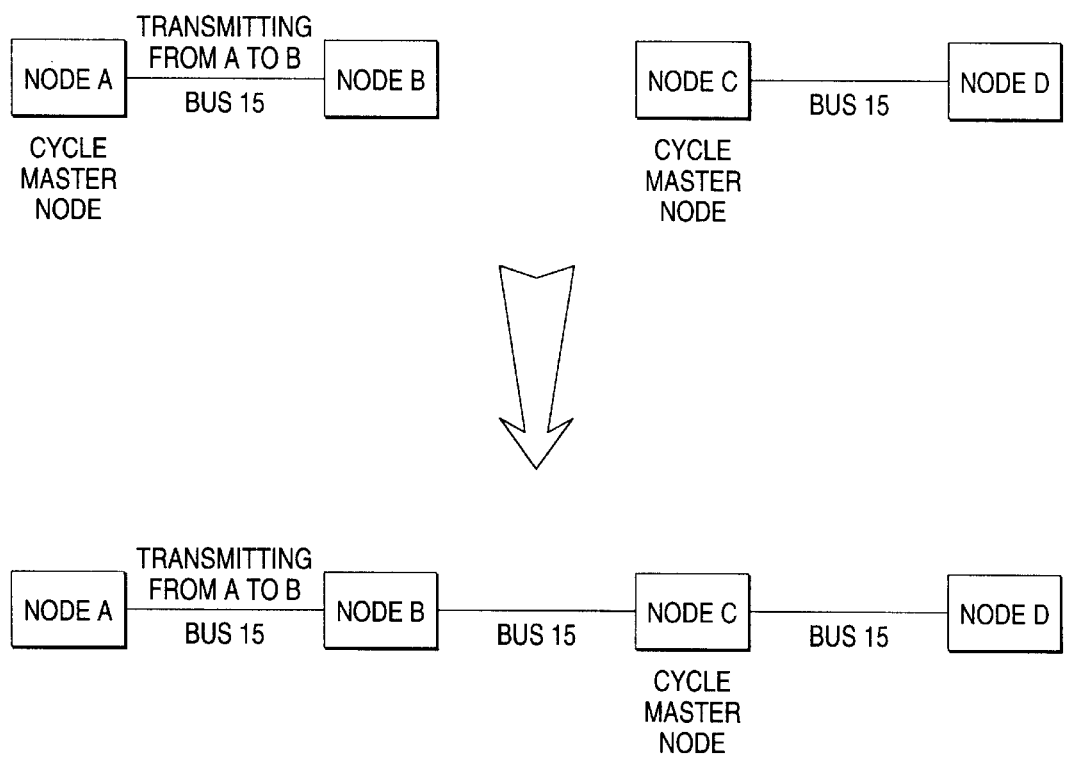
FIG. 13 is a conceptual drawing at the reference time change time.

Specifically, the following case is possible:

As shown in FIG. 13, there are a transmission channel where node A (cycle master node) and node B are connected by bus 15 and the cycle time on the bus 15 is cycle time 1 and a transmission channel where node C (cycle master node) and node D are connected by bus 15 and the cycle time on the bus 15 is cycle time 2 and, for example, the node A transmits data and the node B receives the data.

Assume that in this state, the nodes B and C are connected by bus 15 to place the nodes A to D in one transmission channel and the node C becomes the cycle master node.

At this time, the cycle time (reference time) is changed in the node A.

FIGS. 14H to 14P are charts to show the example in detail.

In the figure, FIGS. 14H to 14N represent the transmitter state and are as follows:

FIG. 14H means a bus reset signal generated when a bus is connected or disconnected.

In the state in the figure, a bus is connected or disconnected when the low-to-high transition of the bus reset signal is made.

FIG. 14I means cycle time in the transmission channel before bus reset. In the embodiment, one Iso cycle is 125 μs.

It is the same as FIG. 12A.

FIG. 14J means cycle time in the transmission channel after bus reset. In the embodiment, one Iso cycle is 125 μs.

FIG. 14K denotes the generation timing of reproduction specification time data SYT.

FIG. 14L is the same as fs/SYT INTERVAL in FIG. 12C.

FIG. 14M is the same as the sample data in FIG. 12D.

FIG. 14N is the same as data in data packet in FIG. 12E.

FIGS. 14O and 14P represent the receiver state as follows:

FIG. 14O is the same as fs/SYT INTERVAL in FIG. 12F.

FIG. 14P is the same as the sample data in FIG. 12G.

For example, assume that at least two nodes transmit and receive data at cycle time 1. In FIGS. 14H to 14P, the cycle time in the receiver is incremented by one every 125 μs based on the reference time sent from the cycle master node and the connected nodes set the reference time as cycle time 1=5, 6, 7 . . .

At this time, reproduction specification time data SYT is generated at the timing (k) and thus is added to audio data at the timing (k). In the embodiment, the transfer delay time $T_D$ added to the reproduction specification time data SYT is set to 4. Thus, for example, the time $$SYT = \text{current cycle time} + \text{transfer delay time} \quad (1)$$
$$= 5 + 4$$
$$= 9$$

is added to sample data a. The time $$SYT = \text{current cycle time} + \text{transfer delay time} \quad (2)$$
$$= 7 + 4$$
$$= 11$$

is added to sample data b.

Likewise, the SYT is added to each sample data.

The data is put into a packet according to the predetermined procedure previously described with reference to FIG. 10 and is sent onto the bus 15.

The receiving node receives the data in the data packet and demodulates the data in the data packet according to the predetermined procedure previously described with reference to FIG. 11.

For example, the sample data shown in FIGS. 14H to 14P is demodulated when the cycle timer is 9.

A case will be discussed wherein bus reset occurs on the transmission bus 15 because a new machine is connected in a state in which data is thus transmitted and received and the new machine becomes the cycle master node.

FIGS. 14H to 14P assume that when the cycle time is 9, bus reset occurs on the transmission bus 15 and a new machine becomes the cycle master node.

At this time, the cycle master node of the new machine has cycle time 2=3, 4, 5 . . . , thus the nodes wherein the reference time is set based on cycle time 1 also set the reference time based on cycle time 2.

Therefore, audio data d after the bus reset has SYT generated based on a new cycle time. Thus, the time $$SYT = \text{current cycle time} + \text{transfer delay time} \qquad (3)$$
$$= 3.6 + 4$$
$$= 7.6$$

is added to the audio data d.

At this time, SYT=13 is added to audio data c already put into a packet before the bus reset, thus the node receiving the data requires considerable time until the data is demodulated.

Thus, in such a case, in the transmitter, a correction may be made to the reproduction specification time data (SYT) by the following method for transmitting the resultant data:

First Embodiment: Transmitter

Figure 15:
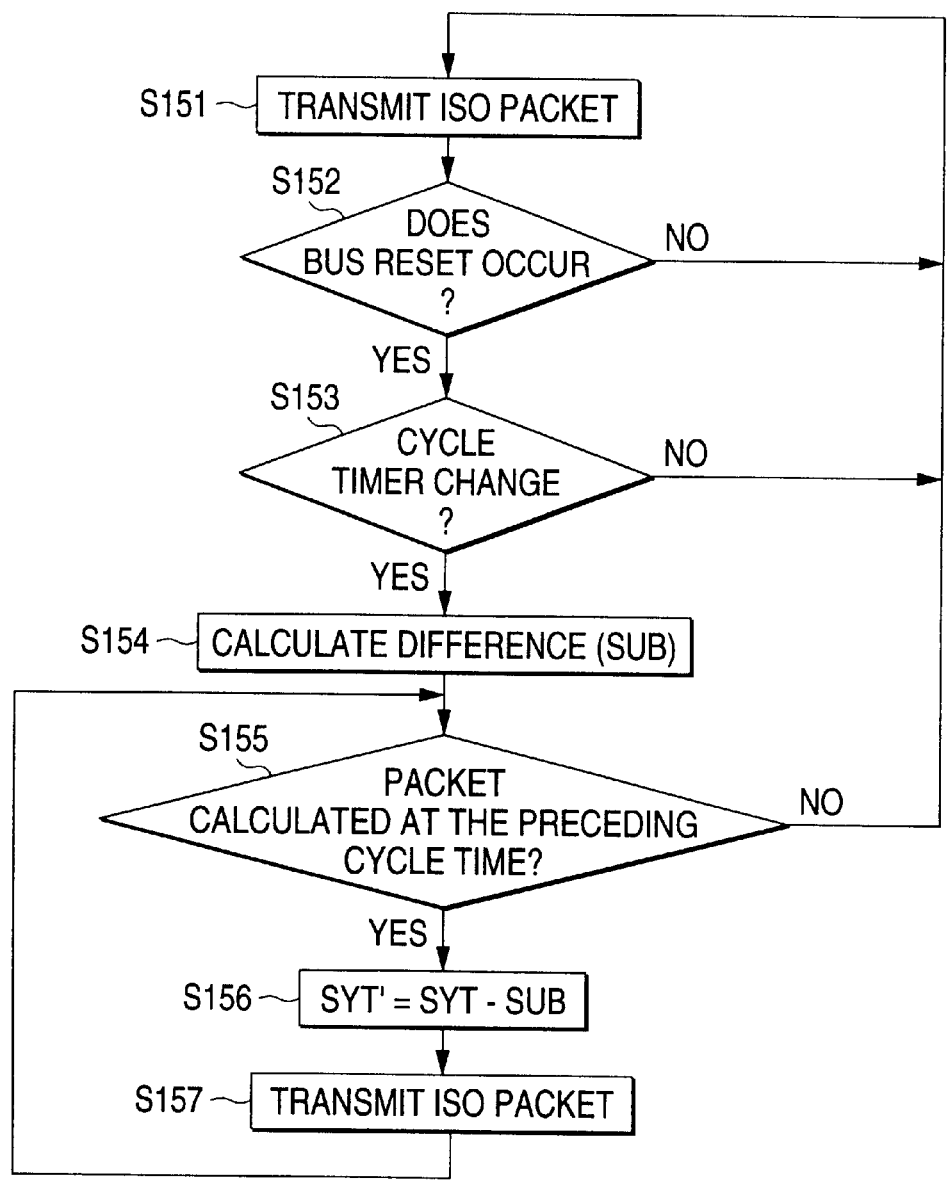
FIG. 15 is a flowchart to show a first embodiment of the invention.

FIG. 15 is a flowchart to show the transmitter state for showing one technique for the transmitter to deal with the above-described problem.

Figure 16:
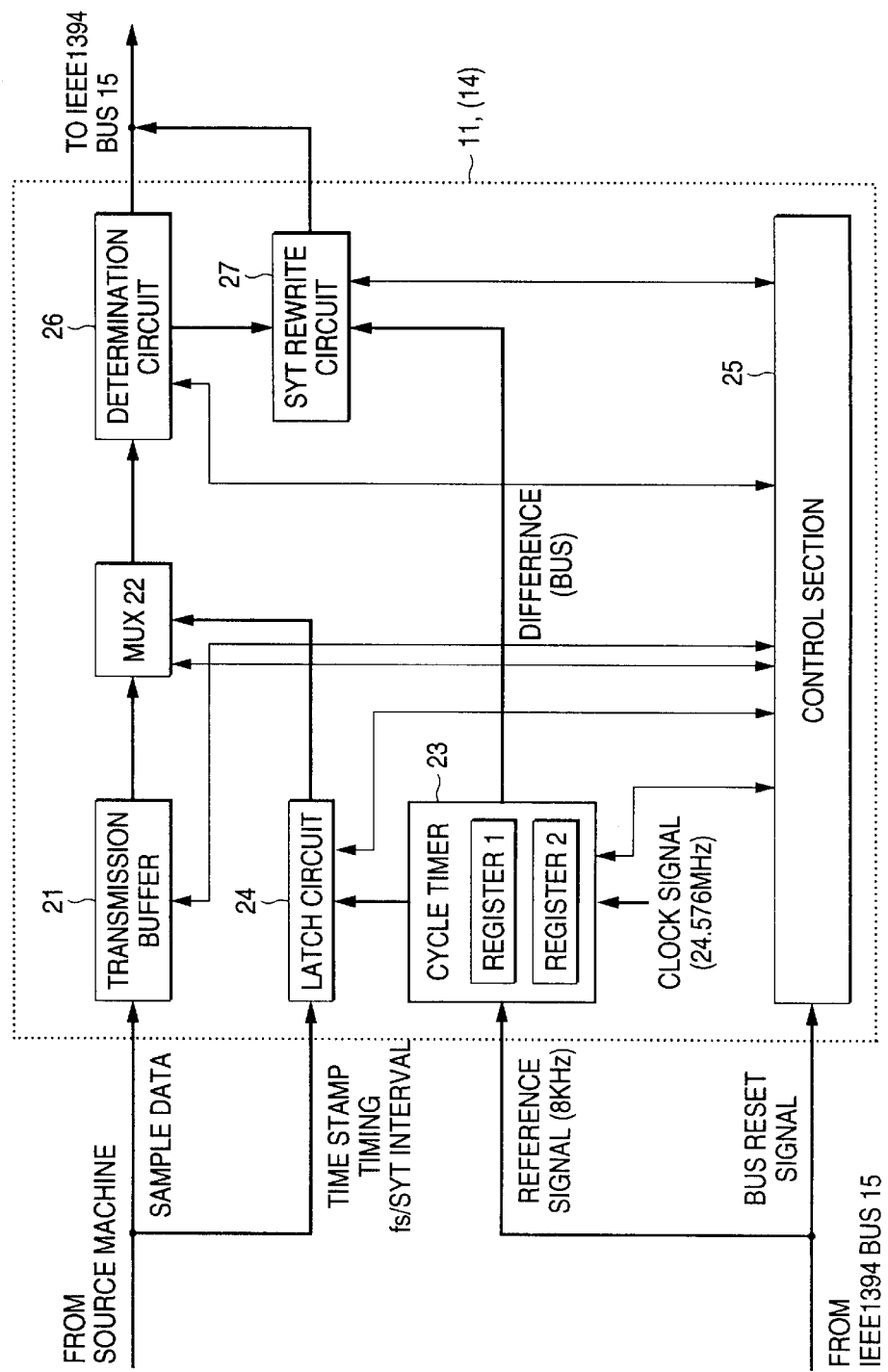
FIG. 16 is a block diagram to show the configuration of a transmitter in the first embodiment of the invention.

FIG. 16 is a block diagram provided by extracting the portion related to the technique from the block diagram of FIG. 10. Circuit parts identical with those previously described with reference to FIG. 10 are denoted by the same reference numerals in FIG. 16 and will not be discussed again. FIG. 16 also shows the state of the transmitter of any other node than the cycle master node.

In the embodiment, the transmitter shown in FIG. 10 further includes a determination circuit 26 and an SYT rewrite circuit 27, and a cycle timer 23 comprises two registers each for retaining a cycle time.

The determination circuit 26 is a circuit for determining whether data transmitted from an MUX 22 is data received before or after bus reset.

The SYT rewrite circuit 27 is a circuit for rewriting the SYT of data transmitted from the determination circuit 26 based on a difference (SUB) output from the cycle timer 23.

Figure 14:
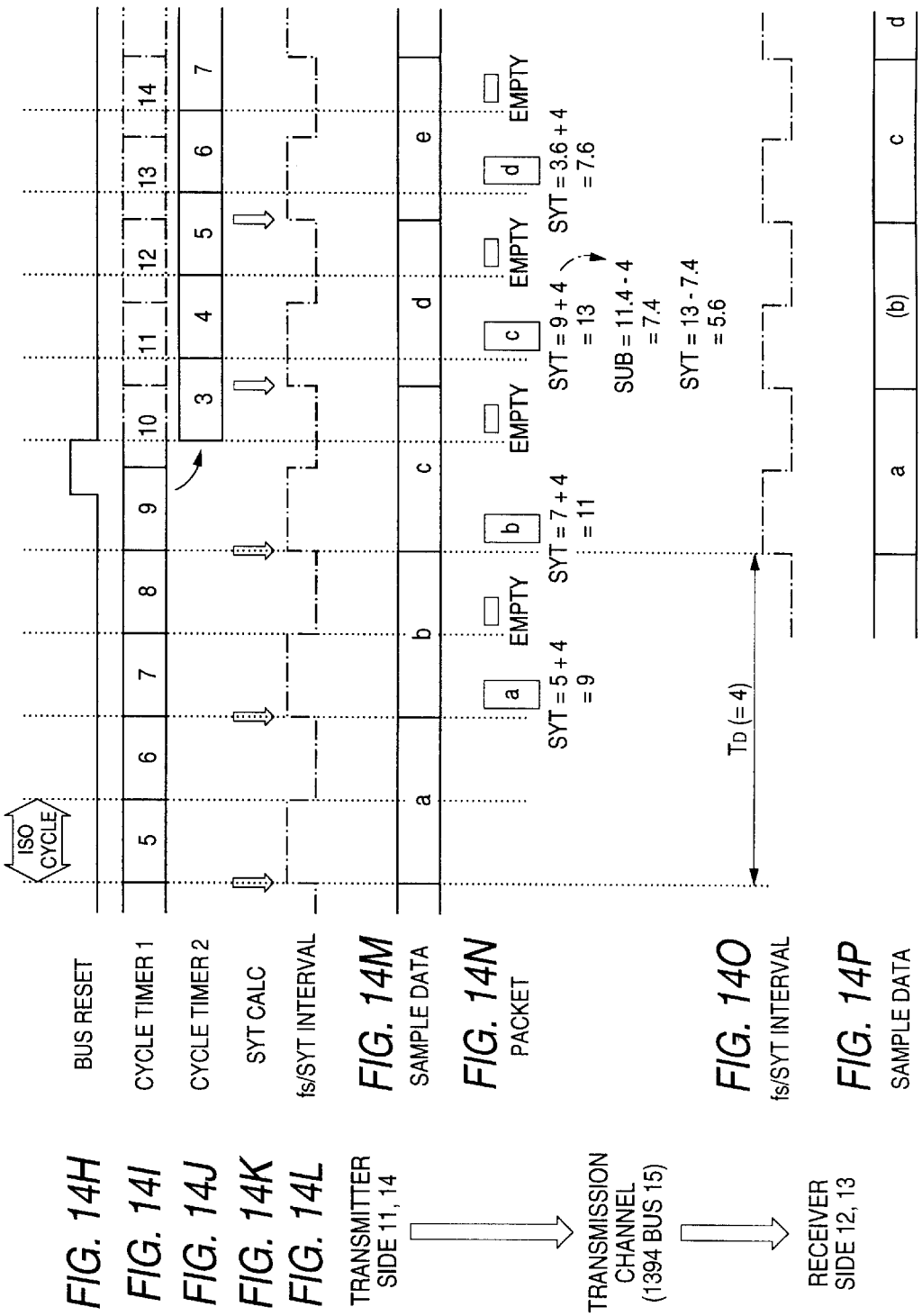
FIGS. 14H to 14P are timing charts detailed drawing at the reference time change time.

A specific method concerning the first embodiment of the invention will be discussed with reference to FIGS. 14 to 16.

For example, assuming that at least two nodes transmit and receive data at cycle time 1 as described above, cycle time 1=5, 6, 7 . . . is transmitted from a cycle master node and the nodes connected to the cycle master node set the reference time. At the time, the cycle timer 23 retains cycle time 1 as the reference time, for example, in a register 1 in the cycle timer 23, counts clock signal from the value indicated in the cycle time 1, and supplies the count to a latch circuit 24 as the time value.

The node to transmit data onto a transmission bus 15 generates a predetermined SYT in the latch circuit 24, adds the SYT to the data in the MUX 22, and transmits Iso packet onto the transmission bus 15 at step S151.

In this state, if bus reset occurs on the transmission bus 15 at step S152, a control section 25 receives a bus reset signal.

If bus reset does not occur, Iso packet transmission and reception are repeated as usual (N at step S152).

After receiving the reset signal, the control section 25 transmits a predetermined control signal to the cycle timer 23 and the determination circuit 26.

After receiving the control signal, the cycle timer 23 retains cycle time 2 received after the bus reset, for example, in a register 2. The cycle timer 23 checks whether or not the cycle times in the registers 1 and 2 change at step S153. If they do not change (N at step S153), the cycle timer 23 performs normal processing according to the value of the cycle time retained in the register 1. On the other hand, if the cycle times in the registers 1 and 2 change (Y at step S153), the cycle timer 23 calculates the difference (SUB) between the cycle time value retained in the register 1 and that retained in the register 2 as Difference (SUB)=cycle time value in register 1−cycle time value in register 2 (4)

at step S154, and outputs the difference (SUB) to the SYT rewrite circuit 27. After bus reset occurs, the cycle timer 23 counts clock signal from the value indicated in the cycle time 2 based on the cycle time 2 and supplies the count to the latch circuit 24 as the time value.

For example, as shown in FIGS. 14H to 14P, the cycle time becomes cycle time 2 and the cycle timer 23 sets the reference time at cycle time 2=3, 4, 5 . . .

After receiving the control signal, the determination circuit 26 determines whether the data supplied from the MUX 22 is a value at cycle time=1 or a value at cycle time=2 at step S155, for example, by any of the following methods: (I) in a transmission buffer 21 or the cycle timer 23, when data after bus reset is stored in the buffer, a flag is assigned to the data and the determination circuit 26 determines whether the data is a value at cycle time=1 or a value at cycle time=2 according to the flag; (II) the buffer size in the transmission buffer 21 or the cycle timer 23 at the bus reset time is detected and the determination circuit 26 compares the size of the supplied data, thereby determining whether the data is a value at cycle time=1 or a value at cycle time=2; or (III) the determination circuit 26 receives the current cycle time from the cycle timer 23 or the control section 25 and compares the value resulting from adding transfer delay time to the cycle time with the SYT added to data sent from the MUX 22, and if the time values do not match, determines that the data is data received before bus reset.

For example, in the method (III), taking the example in FIGS. 14H to 14P, SYT=13 is added to sample data c put into a packet and 13 is compared with 8 (cycle time=4 of the current cycle time plus transfer delay time 4) and if the time values do not match, the data is sent to the SYT rewrite circuit 27.

The determination circuit 26 sends the data at a new cycle time after bus reset intact onto the transmission bus 15 (N at step S155) and sends the data received before bus reset to the SYT rewrite circuit 27.

The SYT rewrite circuit 27 receives the difference (SUB) from the cycle timer 23 and receives data received before bus reset from the determination circuit 26, then generates a new SYT' as SYT'=SYT−difference (SUB) (5)

at step S156 and replaces the SYT of the data with the SYT'.

After this, the SYT rewrite circuit 27 sends the data onto the transmission bus 15 at step S157.

After step S157, again the determination circuit 26 determines whether the packet transmitted from the MUX 22 is data before or after bus reset at step S155. If the packet is data before bus reset, again steps S156 and later are executed; if the packet is data after bus reset, control returns to step S151 and normal transmission is executed.

The control section 25 can also check whether or not the cycle times in the registers change at step S153.

Thus, in the first embodiment, after bus reset occurs, in the transmitting node, SYT of data not yet transmitted among data to which SYT is added at the cycle time before the bus reset is rewritten based on a new cycle time value, so that the time lag problem occurring in the receiving node can be circumvented.

Since it is preferred to make correction in the first embodiment just before data is sent onto the transmission bus, it is most suitable to place the determination circuit 26 and the SYT rewrite circuit 27 at the stage following the MUX circuit 22 as shown in FIG. 16, but may be placed anywhere if they are at the stage following the latch circuit 24. That is, after the reproduction specification time data (SYT) is generated, whether the data is data before or after the reference time changes is determined and a correction may be made in the SYT rewrite circuit 27.

The first embodiment makes it possible to completely prevent information from being lost. However, if a part of information may be lost, the SYT rewrite circuit 27 in FIG. 16 can also be changed to a data deletion circuit for deleting data containing a time lag. In this case, the difference (SUB) is not required and the cycle timer 23 may have at least one register; the circuitry can be simplified.

Next, embodiments for a receiver to deal with the problem of the invention will be discussed.

First, the receiver state in the bus connection state previously described with reference to FIG. 13 will be discussed with reference to FIG. 17.

Figure 17:
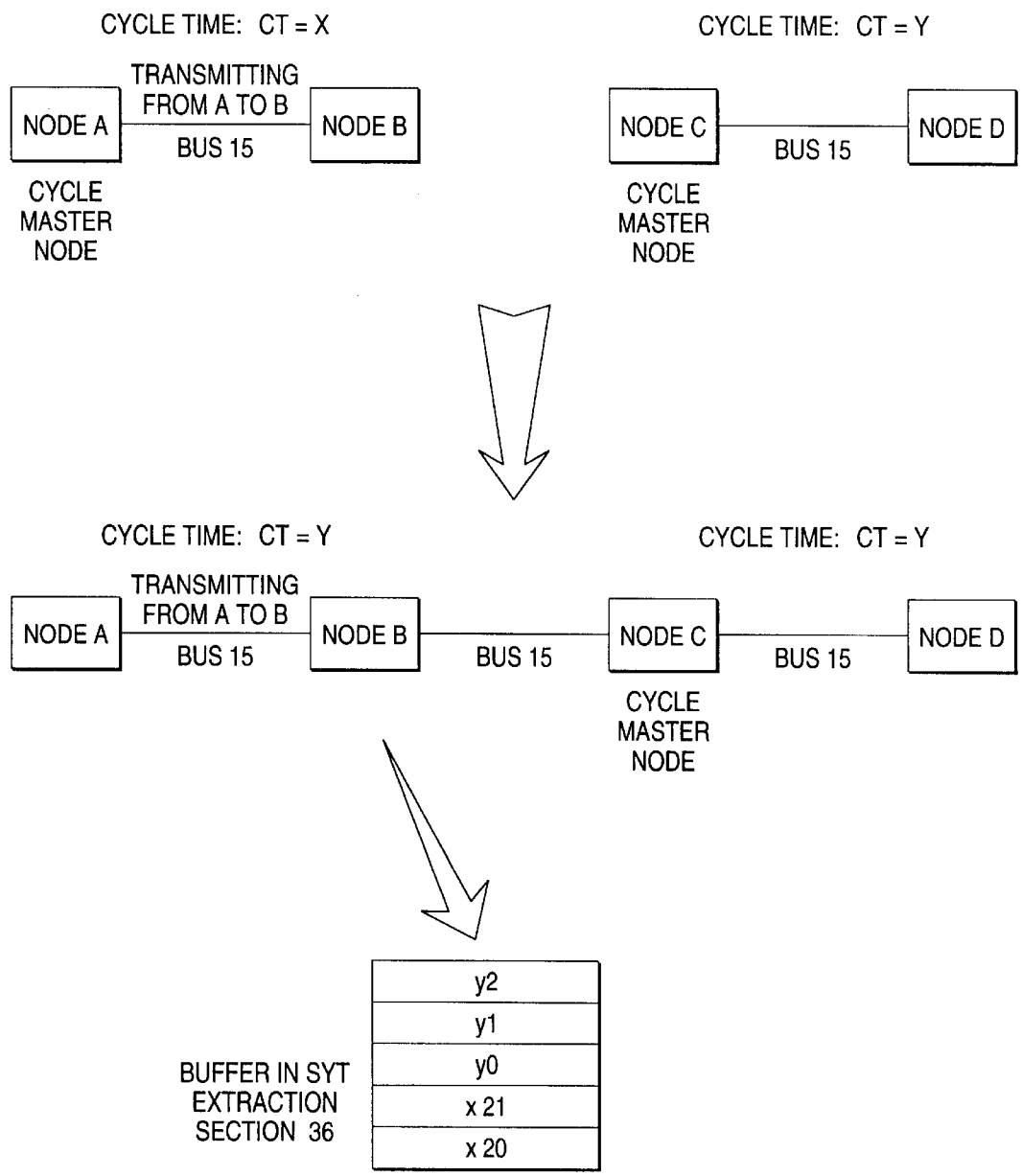
FIG. 17 is a drawing to describe a problem involved in a receiver.

As shown in FIG. 17, bus 15 connecting at least two nodes transmitting and receiving data at cycle time CT=X and bus 15 connecting at least two nodes transmitting and receiving data at cycle time CT=Y are connected and the cycle time on the resultant bus 15 becomes CT=Y.

At this time, SYTs at cycle time CT=X (x20 and x21) and SYTs at cycle time CT=Y (y0, y1, and y2) are mixed in a buffer in an SYT extraction section 36 of the receiving node operating at CT=X.

For example, if the SYTs (x20 and x21) are earlier data than at CT=Y, the cycle time reference time after the bus reset, the SYT (reproduction specification time data) of the data does not match the cycle time Tc (reference time) in the receiving party for hours and the buffer overflows, making it impossible to perform normal reception data processing.

At the time, it is possible to take any of the following five recovery means in the receiving party:

(1) After the bus reset, the reception data and the SYT of the data stored in the buffer in the receiving party before the bus reset are all deleted, and data after the bus reset is processed as usual;

(2) after the bus reset, data transmission to the buffer is interrupted until the data stored in the buffer in the receiving party before the bus reset is processed, and after the data stored before the bus reset has been processed, processing of the data having SYT information after the bus reset is started;

(3) after the bus reset, only SYTs stored in the buffer in the receiving party are all deleted, the data stored just before the bus reset is processed according to the reproduction sampling clock fs generated based on the reproduction reference clock signal generated before the bus reset, and data after the bus reset is processed as usual;

(4) after the bus reset, the data stored before the bus reset is processed using dummy SYT or a dummy reproduction reference clock signal and after the data stored before the bus reset has been all processed, usual processing is performed using SYT or a reproduction reference clock signal after the bus reset; or (5) after the bus reset, the data stored before the bus reset is processed using the cycle time set before the bus reset and after the data stored before the bus reset has been all processed, usual processing is performed using cycle time set after the bus reset.

Specific methods of (1) to (5) described above will be discussed with reference to the accompanying drawings as second to sixth embodiments:

Second Embodiment: Receiver

Figure 18A:
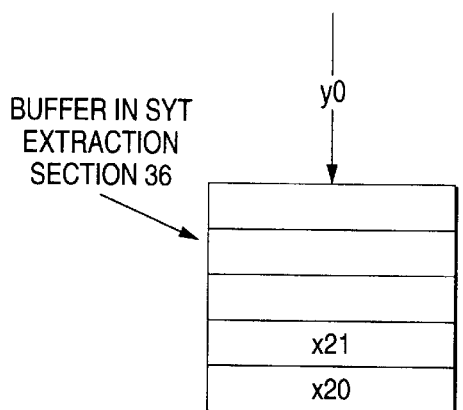
FIGS. 18A and 18B are schematic drawings to show a second embodiment of the invention.
Figure 18B:
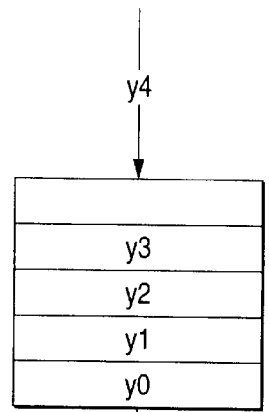

FIGS. 18A and 18B are drawings to schematically show the method of (1) described above.

FIG. 18A shows the state of a buffer in an SYT extraction section 36 just after bus reset in a receiving party operating at cycle time CT=X and FIG. 18B shows the buffer state after the method (1) is executed.

That is, since transmission and reception are executed at cycle time CT=X before bus reset, SYTs of x20 and x21 are stored in the buffer in the SYT extraction section 36 (FIG. 18A).

After this, when bus reset occurs and the cycle time on the bus becomes CT=Y, all SYTs stored in the buffer in the SYT extraction section 36 are deleted. The data in a reception buffer 35 in the packet containing the SYT is also deleted.

After the bus reset, SYTs at cycle time CT=Y are stored in the buffer in the SYT extraction section 36 as y0, y1, y2 . . . (FIG. 18B).

Thus, in the second embodiment, after the bus reset, the reception data and the SYT of the data stored in the buffers in the receiving party before the bus reset are all deleted.

Figure 19:
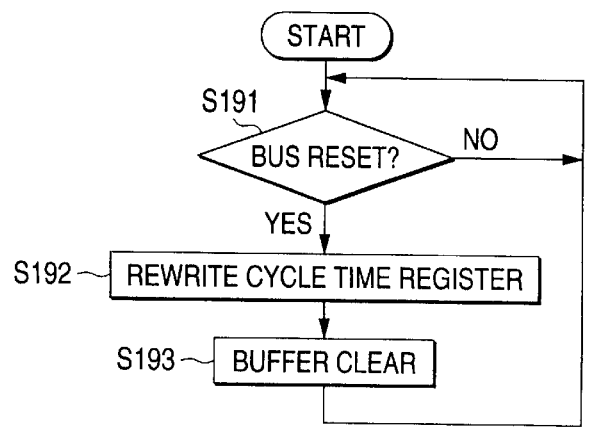
FIG. 19 is a flowchart to show the second embodiment of the invention.
Figure 20:
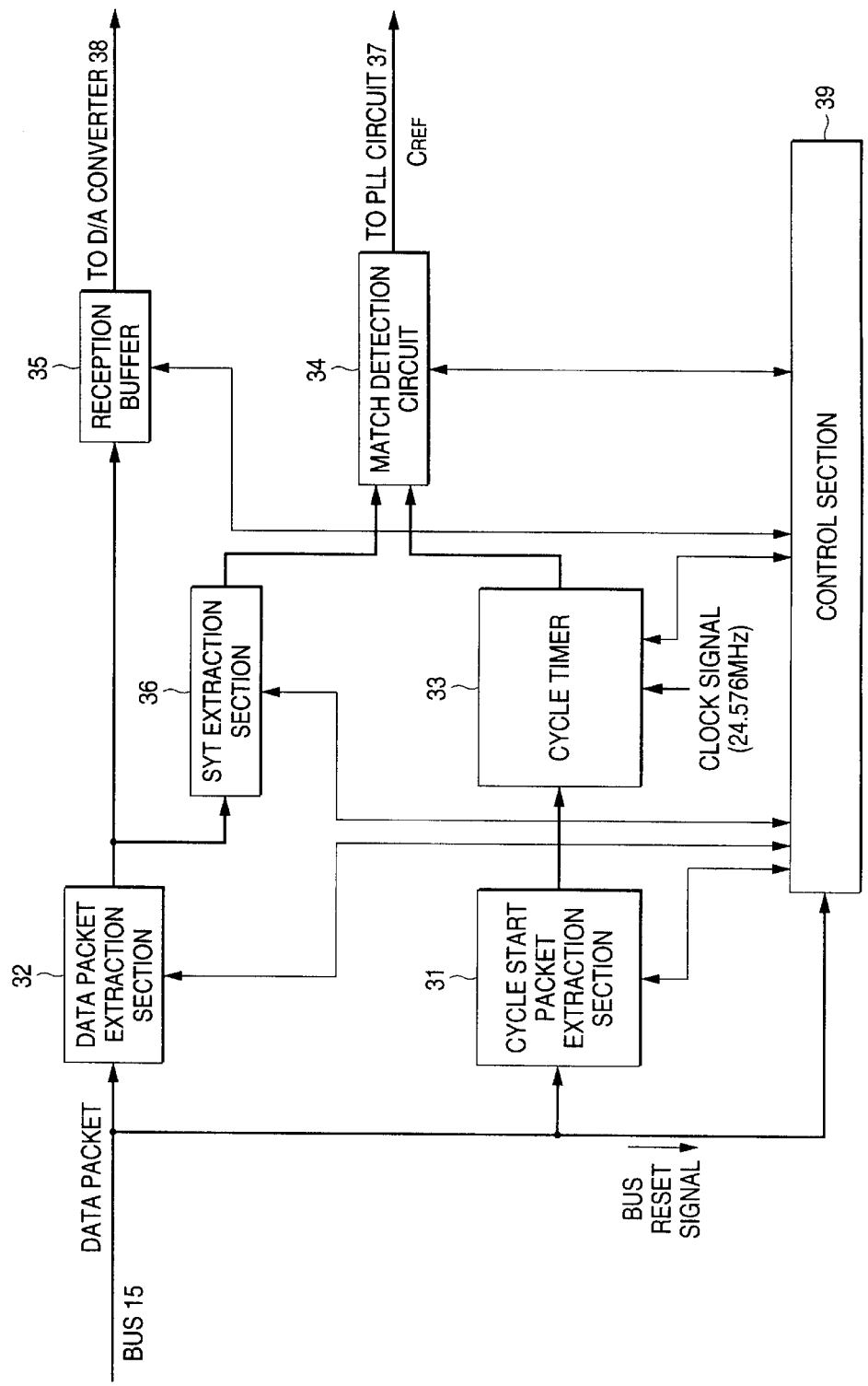
FIG. 20 is a block diagram of the second embodiment of the invention.

FIG. 19 is a flowchart to show the receiver state described above. FIG. 20 is a block diagram provided by extracting the portion related to the second embodiment from the block diagram of FIG. 11. Circuit parts identical with those previously described with reference to FIG. 11 are denoted by the same reference numerals in FIG. 20 and will not be discussed again.

The specific method of the second embodiment will be discussed with reference to FIGS. 19 and 20.

First, in a state in which data is transmitted and received on a bus 15 by at least two nodes, a cycle start packet extraction section 31 extracts a data packet from the bus 15 and supplies extracted cycle start packet CS to a cycle timer 33, which then sets the time value indicated in the cycle start packet CS in a register (not shown).

On the other hand, a data packet extraction section 32 extracts an isochronous packet on the bus 15 and feeds data in the packet into the reception buffer 35. The SYT extraction section 36 extracts SYT contained in a CIP header in the isochronous packet.

After this, data demodulation processing is performed in predetermined data reception processing previously described with reference to FIG. 11.

If bus reset occurs at step S191 because of connection of a new machine or disconnection of an existing machine while data is being transferred, a control section 39 receives a bus reset signal. After this, the cycle timer 33 receives a new cycle start packet CS at step S192. The cycle timer 33 receiving the cycle start packet CS is set to the time value indicated in the cycle start packet CS, then counts 24.576-MHz clock signal from the setup time value and outputs the count to a match detection circuit 34 as cycle time (reference time) Tc.

The control section 39 transmits a control signal to the reception buffer 35 and the SYT extraction section 36 so as to clear the data in the buffers.

Upon reception of the control signal, the reception buffer 35 and the SYT extraction section 36 clear all the data in the buffers at step S193.

After step S193, usual operation is repeated until bus reset occurs.

That is, the match detection circuit 34 compares the cycle time Tc supplied from the cycle timer 33 with a new SYT supplied from the SYT extraction section 36. If the time values match, the match detection circuit 34 outputs a reproduction reference clock signal $C_{REF}$. The subsequent steps are executed as described above.

If bus reset does not occur at step S191, usual operation is also repeated until bus reset occurs.

Thus, in the second embodiment, when bus reset occurs, the data in the reception buffer 35 and the buffer in the SYT extraction section 36 are all cleared and processing of data after the bus reset is started as usual. Therefore, even if the time information before the bus reset differs from that after the bus reset, normal processing is performed.

In the second embodiment, the data corresponding to SYT (x20, x21) shown in FIG. 18A is lost, but data demodulation is restarted in the simple configuration.

Third Embodiment: Receiver

FIGS. 21A and 21B are drawings to schematically show the method of (2) described above.

The buffer state in an SYT extraction section 36 in FIGS. 21A and 21B is the same as that in the second embodiment. FIG. 21A shows the state of a buffer in the SYT extraction section 36 just after bus reset in a receiving party operating at cycle time CT=X and FIG. 21B shows the buffer state after the method (2) is executed.

That is, since transmission and reception are executed at cycle time CT=X before bus reset, SYTs of x20 and x21 are stored in the buffer in the SYT extraction section 36 (FIG. 21A).

After this, when bus reset occurs and the cycle time on the bus becomes CT=Y, the SYT extraction section 36 interrupts input of new SYT. After all the data stored in the SYT extraction section 36 before the bus reset has been processed, the SYT extraction section 36 restarts input of new SYT.

After input of new SYT is restarted, SYTs at cycle time CT=Y are stored in the buffer in the SYT extraction section 36 as y2, y3, y4, y5 . . . (FIG. 21B).

Thus, in the third embodiment, after the bus reset, data feeding into the buffer is interrupted until the data stored in the buffer in the receiving party before the bus reset is processed, and after the data stored before the bus reset has been processed, feeding of the data having SYT information after the bus reset is started.

Figure 23:
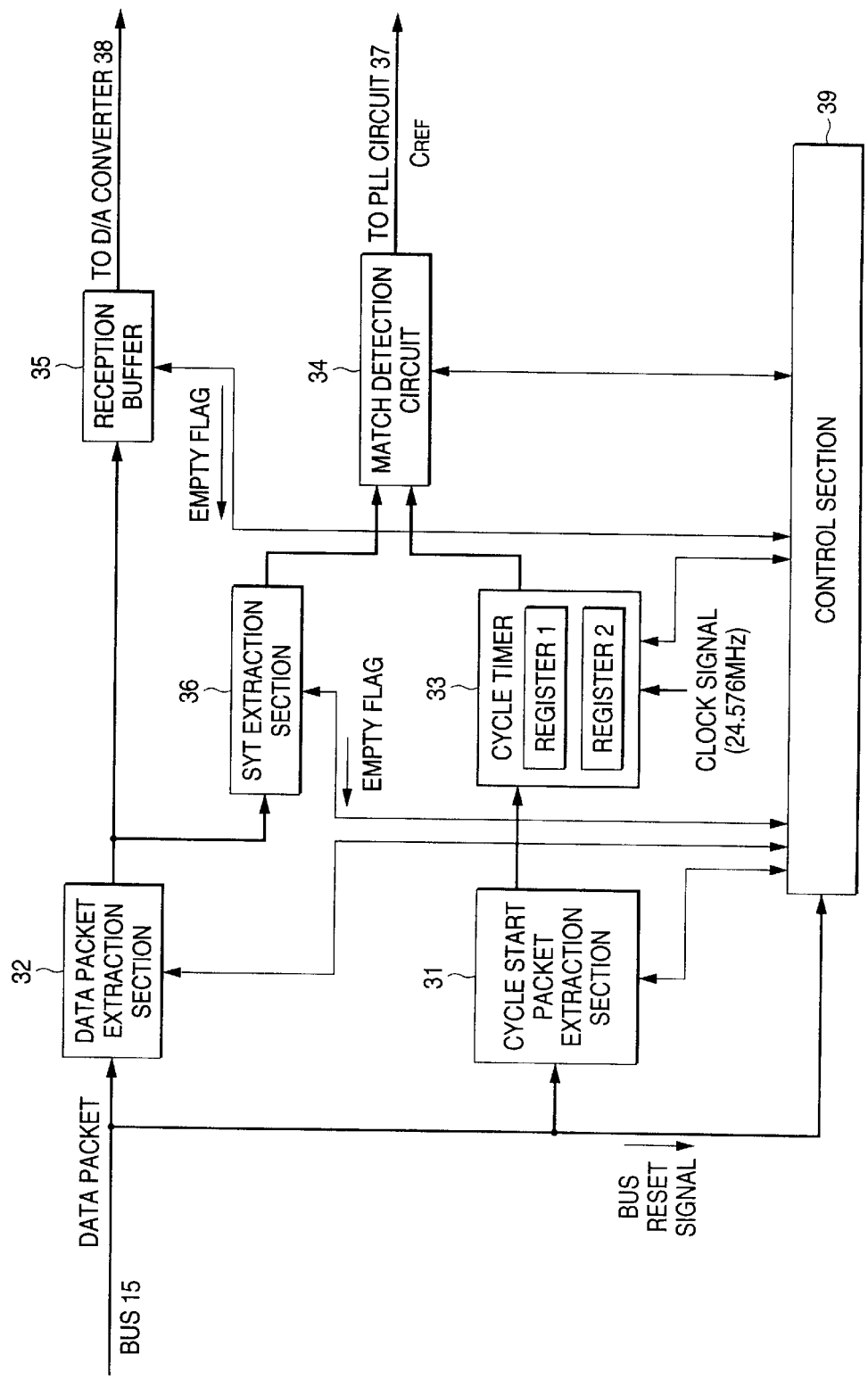
FIG. 23 is a block diagram of the third embodiment of the invention.

FIG. 22 is a flowchart to show the receiver state described above. FIG. 23 is a block diagram provided by extracting the portion related to the second embodiment from the block diagram of FIG. 11. Circuit parts identical with those previously described with reference to FIG. 11 are denoted by the same reference numerals in FIG. 23 and will not be discussed again.

In the embodiment, a cycle timer 33 has two registers for temporarily retaining data.

The specific method of the third embodiment will be discussed with reference to FIGS. 22 and 23.

First, in a state in which data is transmitted and received on a bus 15 by at least two nodes, a cycle start packet extraction section 31 extracts a data packet from the bus 15 and supplies extracted cycle start packet CS to the cycle timer 33, which then sets the time value indicated in the cycle start packet CS in a register 1, for example.

On the other hand, a data packet extraction section 32 extracts an isochronous packet on the bus 15 and feeds data in the packet into a reception buffer 35. The SYT extraction section 36 extracts SYT contained in a CIP header in the isochronous packet.

After this, data demodulation processing is performed in data reception processing described above.

If bus reset occurs at step S221 because of connection of a new machine or disconnection of an existing machine while data is being transferred, a control section 39 receives a bus reset signal. After this, the control section 39 sends a control signal to the cycle timer 33 for instructing the cycle timer 33 to store a new cycle time in another register. Upon reception of the control signal, the cycle timer 33 writes a new cycle time into a second register 2, for example, at step S222.

At this time, the cycle timer 33 generates the cycle time of the home machine based on the cycle time stored in the register 1 and continues to supply the cycle time to a match detection circuit 34.

On the other hand, the control section 39 transmits a control signal to the reception buffer 35 and the SYT extraction section 36 for instructing the reception buffer 35 and the SYT extraction section 36 to interrupt data write into buffers.

Upon reception of the control signal, the reception buffer 35 and the SYT extraction section 36 interrupt data write into the buffers at step S223.

At this time, processing of the data already stored in the reception buffer 35 before the bus reset is continued.

Then, in the reception buffer 35, whether or not FIFO in the reception buffer 35 becomes empty of data is checked. If the FIFO in the reception buffer 35 does not become empty of data (N at step S224), interrupt of data write into the buffer at step S223 is continued. If the FIFO in the reception buffer 35 becomes empty of data (Y at step S224), the reception buffer 35 returns Empty Flag to the control section 39.

Upon reception of Empty Flag, the control section 39 sends a control signal to the cycle timer 33 for instructing the cycle timer 33 to rewrite cycle time. Upon reception of the control signal, the cycle timer 33 rewrites the cycle time stored in the register 2 into the register 1 at step S225, then generates the cycle time of the home machine based on the cycle time and supplies the generated cycle time to the match detection circuit 34.

The control section 39 sends a control signal to the reception buffer 35 and the SYT extraction section 36 for instructing the reception buffer 35 and the SYT extraction section 36 to restart data write into the buffers.

Upon reception of the control signal, the reception buffer 35 and the SYT extraction section 36 restart data write into the buffers at step S226.

After the reception buffer 35 and the SYT extraction section 36 restart data write into the buffers at step S226, usual operation is repeated until bus reset occurs.

If bus reset does not occur at step S221, usual operation is also repeated until bus reset occurs.

At step S223, control can also be performed so as to instruct the data packet extraction section 32 not to extract data after the bus reset or the data packet extraction section 32 not to transmit data.

In short, control may be performed so that data is not stored in the reception buffer 35 or the SYT extraction section 36.

In the third embodiment, the data amount in the reception buffer 35 is checked. However, data in FIFO in the SYT extraction section 36 is monitored and if the FIFO in the SYT extraction section 36 becomes empty of data, Empty Flag can also be transmitted. As described later in a fifth embodiment, at the bus reset time, the FIFO data amount is measured in either or both of the reception buffer 35 or the SYT extraction section 36 and if the data amount output from the FIFO reaches the measurement value, a predetermined control signal can also be output.

In short, a control signal indicating that the FIFO in either or both of the reception buffer 35 and the SYT extraction section 36 becomes empty of data stored before the bus reset may be output.

Thus, in the third embodiment, after bus reset occurs, data write into the reception buffer 35 and the buffer in the SYT extraction section 36 is interrupted and after the data stored before the bus reset has been processed, processing of data after the bus reset is started. Therefore, even if the time information before the bus reset differs from that after the bus reset, normal processing is performed.

Thus, in the third embodiment, the data related to SYT (y0, y1) shown in FIG. 21A is lost, but the data stored before the bus reset is processed normally and usual processing is also restarted after the bus reset.

Fourth Embodiment: Receiver

Figure 24A:
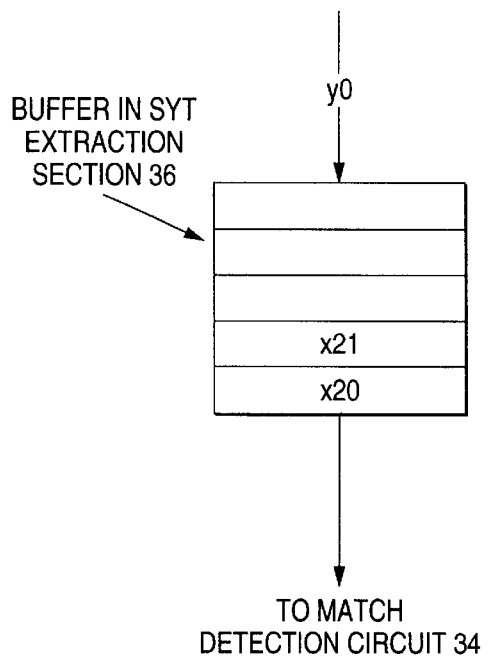
FIGS. 24A and 24b are schematic drawings to show a fourth embodiment of the invention.
Figure 24B:
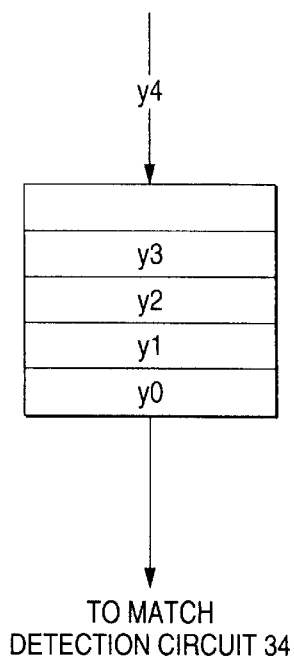

FIGS. 24A and 24b are drawings to schematically show the method of (3) described above.

The buffer state in an SYT extraction section 36 in FIGS. 24A and 24B is the same as that in the second embodiment. FIG. 24A shows the state of a buffer in the SYT extraction section 36 just after bus reset in a receiving party operating at cycle time CT=X and FIG. 24B shows the buffer state after the method (3) is executed.

That is, since transmission and reception are executed at cycle time CT=X before bus reset, SYTs of x20 and x21 are stored in the buffer in the SYT extraction section 36 (FIG. 24A).

After this, when bus reset occurs and the cycle time on the bus becomes CT=Y, all SYTs stored in the buffer in the SYT extraction section 36 are deleted.

Then, the SYT extraction section 36 starts input of new SYT.

After input of new SYTs, SYTs at cycle time CT=Y are stored in the buffer in the SYT extraction section 36 as y0, y1, y2, y3 . . . (FIG. 24B).

After the bus reset, the data stored in the reception buffer 35 before the bus reset is controlled according to a reproduction sampling clock fs generated by a reproduction reference clock signal $C_{REF}$ generated when cycle time CT=X before the bus reset. After all the data related to the cycle time CT=X has been processed, data related to cycle time CT=Y is processed as usual.

Thus, in the fourth embodiment, after the bus reset, all SYTs stored in the buffer in the SYT extraction section 36 are deleted.

Figure 25:
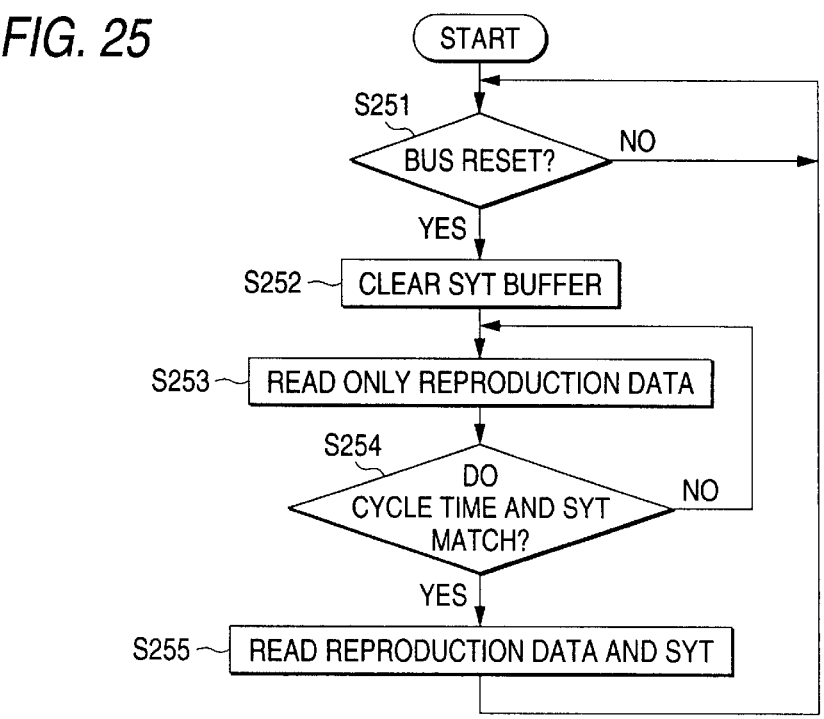
FIG. 25 is a flowchart to show the fourth embodiment of the invention.

FIG. 25 is a flowchart to show the state described above.

The specific method of the fourth embodiment will be discussed with reference to FIGS. 20 and 25.

First, in a state in which usual operation is performed as previously described in the second embodiment, if bus reset occurs at step S251 because of connection of a new machine or disconnection of an existing machine, a control section 39 receives a bus reset signal. After this, the control section 39 sends a control signal to the SYT extraction section 36 so as to clear all SYTs in the buffer.

Upon reception of the control signal, the SYT extraction section 36 clears all the SYTs in the buffer at step S252.

Processing of the data stored in the reception buffer 35 is continued at step S253 in synchronization with a reproduction sampling clock signal fs phase-synchronized with a reference clock $C_{REF}$ generated before the bus reset.

In this state, SYT is not transmitted from the SYT extraction section 36 to a match detection circuit 34 for a while, thus the match detection circuit 34 does not output a reference clock $C_{REF}$. However, a PLL circuit 37 continues to hold the reproduction sampling clock signal fs generated based on the reference clock $C_{REF}$ generated before the bus reset, thus the data stored before the bus reset is processed according to the sampling clock signal fs.

On the other hand, a cycle start packet extraction section 31 extracts a new cycle start packet CS and supplies the cycle start packet CS to a cycle timer 33. The SYT extraction section 36 extracts a new SYT and supplies the SYT to the match detection circuit 34.

The cycle timer 33 counts 24.576 MHz clock signal from the time value indicated in the cycle start packet CS supplied after the bus reset and supplies cycle time Tc to he match detection circuit 34.

The match detection circuit 34 compares the cycle time Tc supplied from the cycle timer 33 with the SYT supplied from the SYT extraction section 36 at step S254. If the time values match (Y at step S254), the match detection circuit 34 generates a reproduction reference clock signal $C_{REF}$.

If the cycle time Tc and the SYT do not match (N at step S254), control goes to step S253 at which processing of the data stored in the reception buffer 35 is continued in synchronization with the reproduction sampling clock signal fs phase-synchronized with the reference clock $C_{REF}$ generated before the bus reset. On the other hand, if the cycle time Tc and the SYT match, the data stored in the reception buffer 35 is processed at step S255 in synchronization with the reproduction sampling clock signal fs phase-synchronized with the reproduction reference clock signal $C_{REF}$ when the time values match.

After usual reproduction processing is restarted at step S255, whether or not bus reset occurs is checked.

If bus reset does not occur at step S251, the usual operation is repeated until bus reset occurs.

Thus, in the fourth embodiment, all the data in the buffer in the SYT extraction section 36 is cleared, the data stored just before the bus reset is processed according to the reproduction sampling clock signal fs generated before the bus reset, and the data after the bus reset is processed as usual. Therefore, even if the time information before the bus reset differs from that after the bus reset, normal processing is performed.

In the fourth embodiment, the data stored before the bus reset and that stored after the bus reset are processed normally without losing the data before and after the bus reset.

Fifth Embodiment: Receiver

A fifth embodiment of the invention corresponds to the method of (4) described above. After bus reset occurs, the data stored before the bus reset is processed using dummy SYT or a dummy reference clock and after all the data stored before the bus reset has been processed, usual processing is performed using SYT or a reference clock after the bus reset.

The embodiment provides two methods, which will be discussed in detail as first and second methods of the fifth embodiment.

First Method of Fifth Embodiment

The first method of the fifth embodiment is a method of generating dummy SYT.

Figure 26:
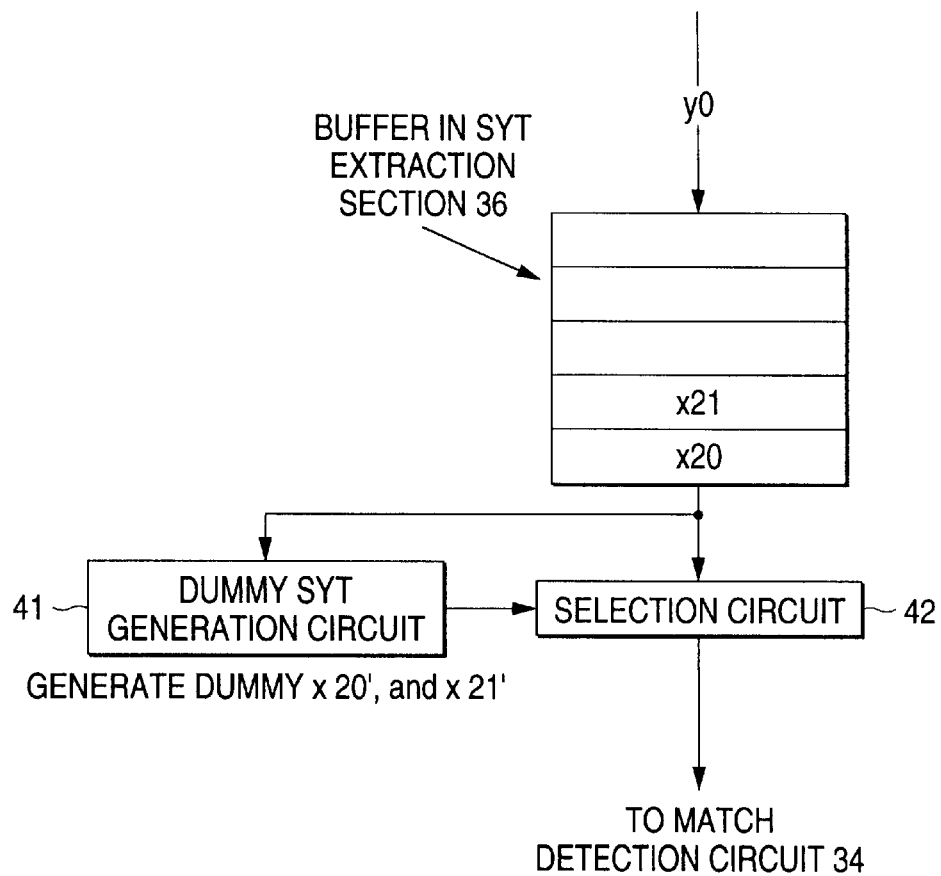
FIG. 26 is a schematic drawing to show a first method of a fifth embodiment of the invention.

FIG. 26 is a drawing to schematically show the first method of the fifth embodiment.

That is, before bus reset occurs, transmission and reception are executed at cycle time CT=X, thus SYTs of x20 and x21 are stored in a buffer in an SYT extraction section 36.

After this, when bus reset occurs and the cycle time on a bus becomes CT=Y, the SYT extraction section 36 inputs new SYT.

After input of new SYTs, SYTs at cycle time CT=Y are stored in the buffer in the SYT extraction section 36 as y0, y1, y2, y3 . . . .

On the other hand, a dummy SYT generation circuit 41 generates x20' and x21' of dummy SYTs corresponding to SYTs of x20 and x21 after the bus reset occurs, and supplies x20' and x21' to a selection circuit 42, which then changes SYTs from SYTs of the SYT extraction section 36 to the dummy SYTs of the dummy SYT generation circuit 41 in response to the bus reset signal, and supplies the dummy SYTs to a match detection circuit 34.

Upon completion of output of the dummy SYTs, again normal SYTs are supplied to the match detection circuit 34.

Thus, in the first method of the fifth embodiment, after the bus reset, the data stored before the bus reset is processed using dummy SYT and after all the data stored before the bus reset has been processed, usual processing is performed using SYT after the bus reset.

Figure 27:
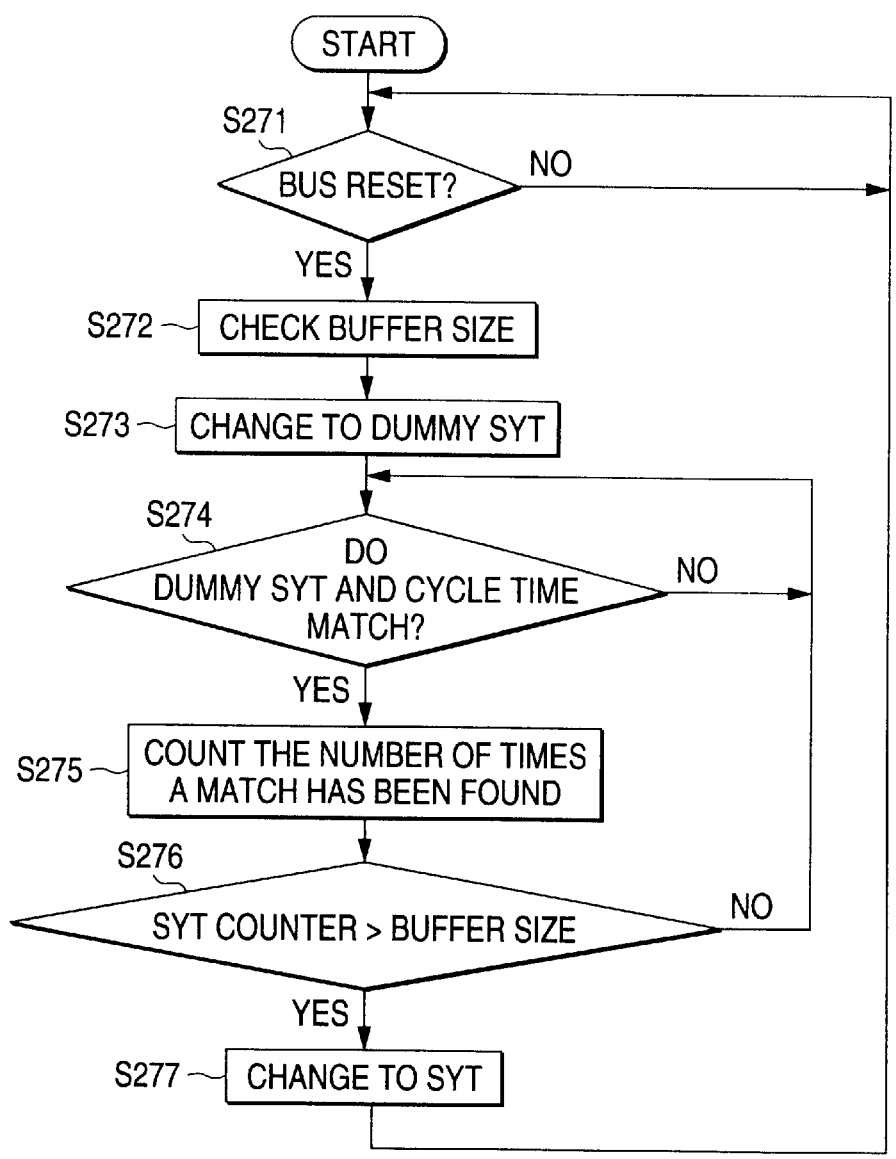
FIG. 27 is a flowchart to show the first method of the fifth embodiment of the invention.
Figure 28:
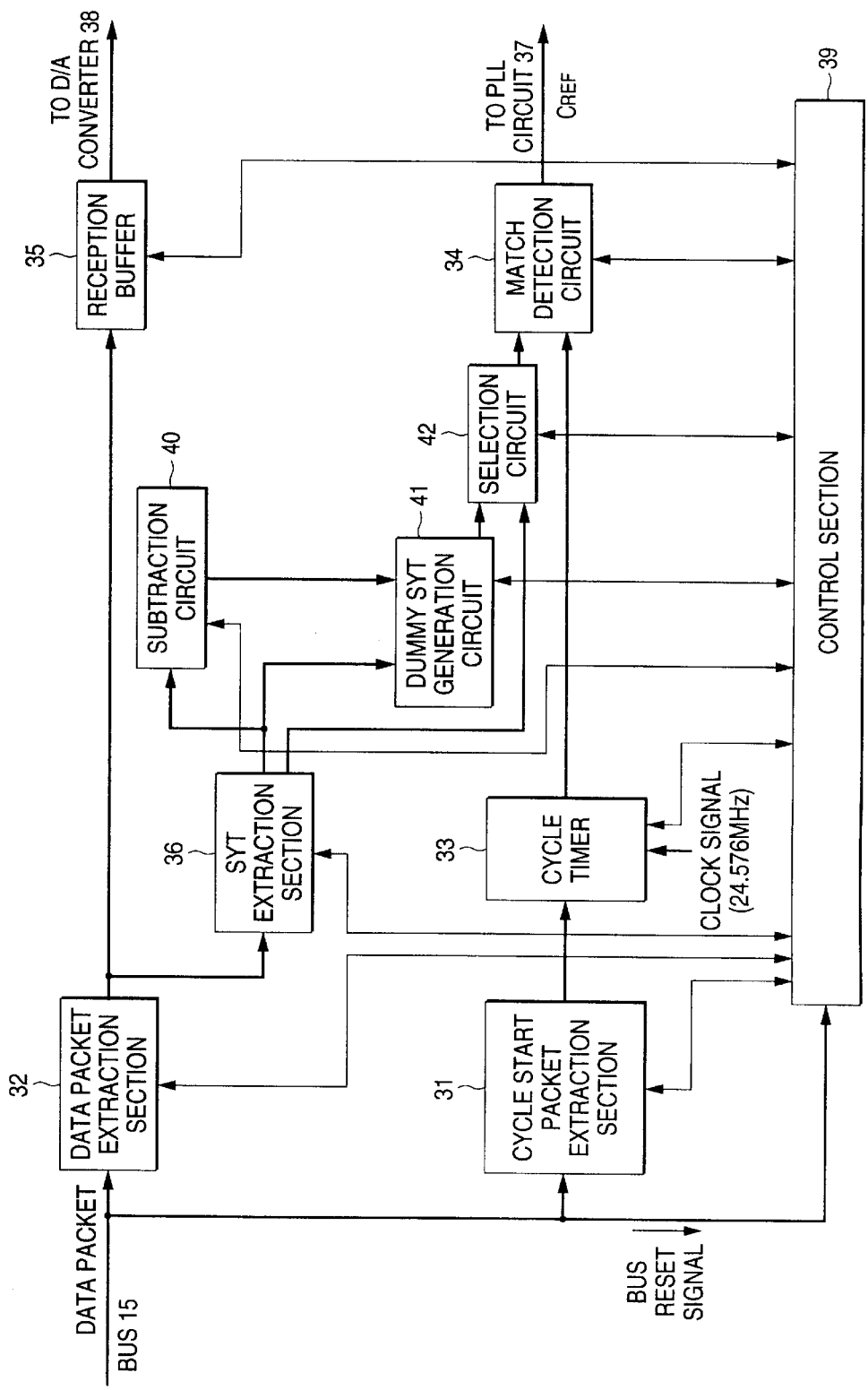
FIG. 28 is a block diagram to show the first method of the fifth embodiment of the invention.

FIG. 27 is a flowchart to show the receiver state described above. FIG. 28 is a block diagram provided by extracting the portion related to the fifth embodiment from the block diagram of FIG. 11. Circuit parts identical with those previously described with reference to FIG. 11 are denoted by the same reference numerals in FIG. 28 and will not be discussed again.

The fifth embodiment further includes a subtraction circuit 40, the dummy SYT generation circuit 41, and the selection circuit 42.

The subtraction circuit 40 receives SYTs from the SYT extraction section 36, calculates a difference between the preceding and following SYTs according to a calculation expression described later, and supplies the difference to the dummy SYT generation circuit 41 as the time difference (D).

The dummy SYT generation circuit 41 receives the time difference (D) and receives SYT from the SYT extraction section 36. It uses the time difference (D) and the SYT from the SYT extraction section 36 to generate a dummy SYT according to a calculation expression described later and supplies the dummy SYT to the selection circuit 42.

The selection circuit 42 selectively supplies the SYT from the SYT extraction section 36 or the dummy SYT from the dummy SYT generation circuit 41 to the match detection circuit 34.

The first method of the fifth embodiment will be discussed specifically with reference to FIGS. 27 and 28.

First, in a state in which usual operation is performed as previously described in the second embodiment, if bus reset occurs at step S271 because of connection of a new machine or disconnection of an existing machine, a control section 39 receives a bus reset signal. After this, the control section 39 sends a control signal to the SYT extraction section 36 so as to check Buffer Size in the buffer.

Upon reception of the control signal, the SYT extraction section 36 checks Buffer Size in the buffer and returns the Buffer Size to the control section 39 at step S272.

The Buffer Size is a value of counting the number of SYTs stored in the buffer in the SYT extraction section 36 when bus reset occurs. For example, if two SYTs (x20 and x21) are stored before bus reset as shown in FIG. 26, Buffer Size is set to 2.

The control section 39 also sends a change signal to the selection circuit 42.

Upon reception of the change signal, the selection circuit 42 changes the SYT to be supplied to the match detection circuit 34 to the dummy SYT supplied from the dummy SYT generation circuit 41 at step S273.

The control section 39 counts, at step S275, the number of times the match detection circuit 34 has found a match between the SYT from the selection circuit 42 and the cycle time from a cycle timer 33 after the bus reset at step S274. If the count exceeds the Buffer Size at step S276, the control section 39 again transmits a change signal to the selection circuit 42.

This means that the change signal is transmitted to the selection circuit 42 if count>2, for example, in FIG. 26.

Upon reception of the change signal, the selection circuit 42 again changes the SYT to be transmitted to the match detection circuit 34 to normal SYT at step S277.

On the other hand, if the value of counting the dummy SYTs is not greater than the Buffer Size at step S276, control goes to step S274 and steps S274 to S276 are repeated.

After usual reproduction processing is restarted at step S277, whether or not bus reset occurs is checked.

If bus reset does not occur at step S271, the usual operation is repeated until bus reset occurs.

Thus, in the first method of the fifth embodiment, dummy SYT is generated after the bus reset. Therefore, even if the time information before the bus reset differs from that after the bus reset, normal processing is performed.

The specific generation method of a dummy SYT is as follows:

In FIG. 28, SYT is always supplied to the subtraction circuit 40 and when bus reset occurs, the subtraction circuit 40 calculates the time difference between the SYT just before the bus reset (SYT at cycle time CT=X) and the SYT just after the bus reset (SYT at cycle time CT=Y) as $$\text{time difference (D)} = (\text{SYT just before bus reset}) - (\text{SYT just after bus reset}) \quad (6)$$

and supplies the time difference (D) to the dummy SYT generation circuit 41.

The dummy SYT generation circuit 41 adds the time difference to the SYT at cycle time CT=X before the bus reset as $$\text{dummy SYT} = (\text{SYT before bus reset}) + \text{time difference (D)} \quad (7)$$

and supplies the dummy SYT to the selection circuit 42.

Specifically, if bus reset occurs, for example, in a state in which SYTs at cycle time CT=X (x20 and x21) are stored in the buffer in the SYT extraction section 36 as shown in FIG. 26, the SYT extraction section 36 extracts SYT at CT=Y (y0), the next cycle time.

At this time, the subtraction circuit 40 subtracts x21 from y0 to find the time difference (D) and supplies the time difference (D) to the dummy SYT generation circuit 41.

The dummy SYT generation circuit 41 adds the time difference (D) to the SYTs at cycle time CT=X (x20 and x21) transmitted from the SYT extraction section 36 to generate dummy SYTs (x20' and x21') and supplies the dummy SYTs to the selection circuit 42.

The dummy SYTs are thus generated.

In the first method of the fifth embodiment, the selection circuit 42 changes SYT to be supplied to the match detection circuit 34 based on Buffer Size in the buffer in the SYT extraction section 36, but it can also change SYT based on Buffer Size in a reception buffer 35. How to find the Buffer Size is not limited to that in the fifth embodiment; any other method may be adopted if the data amount in the buffer can be found. The SYT extraction section 36 determines whether each SYT is an SYT stored before or after bus reset as described later in a sixth embodiment of the invention, and the selection circuit 42 can also change SYT to be supplied to the match detection circuit 34 based on the determination result.

The time difference (D) can also be transmitted to the cycle timer 33 to generate a dummy cycle time. At the time, the time difference (D) may be subtracted from the cycle time after bus reset.

Second Method of Fifth Embodiment

Next, the second method of the fifth embodiment is a method of generating a dummy reproduction reference clock signal $C_{REF}'$.

Figure 29:
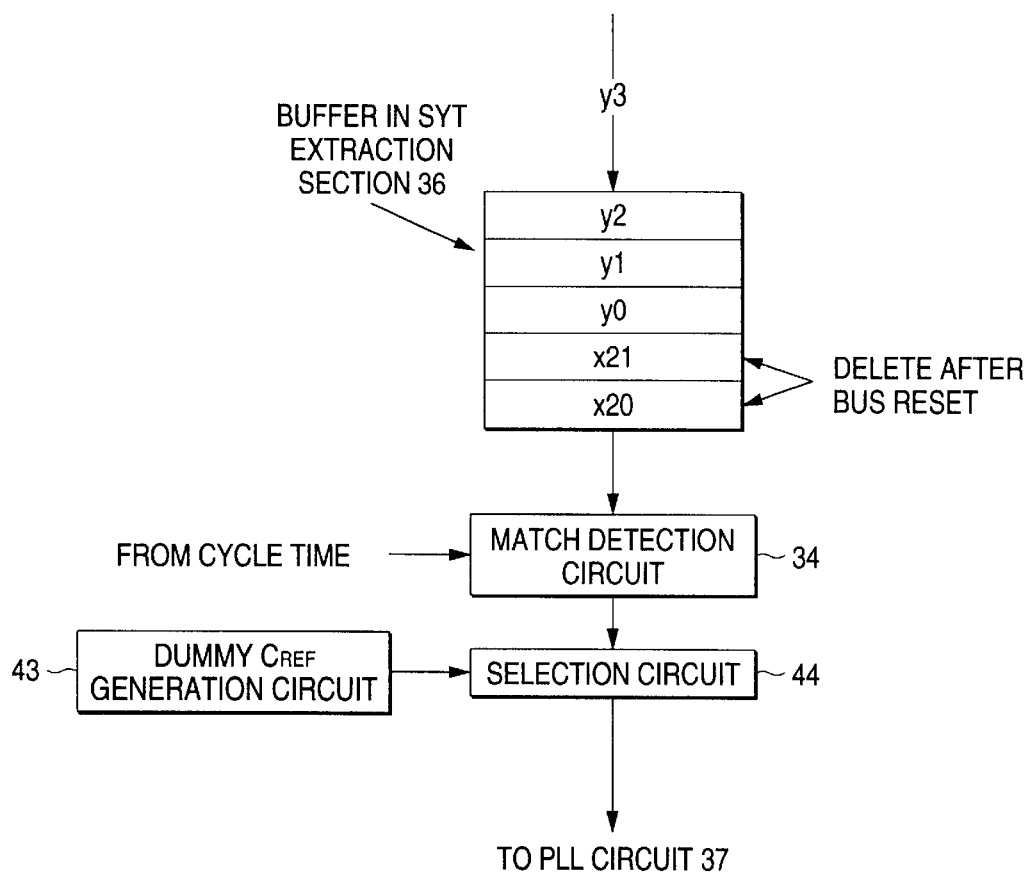
FIG. 29 is a schematic drawing to show a second method of the fifth embodiment of the invention.

FIG. 29 is a drawing to schematically show the second method of the fifth embodiment.

That is, before bus reset occurs, transmission and reception are executed at cycle time CT=X, thus SYTs of x20 and x21 are stored in the buffer in the SYT extraction section 36.

After this, when bus reset occurs and the cycle time on the bus becomes CT=Y, the SYT extraction section 36 inputs new SYT.

After input of new SYTs, SYTs at cycle time CT=Y are stored in the buffer in the SYT extraction section 36 as y0, y1, y2, y3 . . . .

On the other hand, a dummy reproduction reference clock signal $C_{REF}'$ generation circuit 43 generates dummy reproduction reference clock signal $C_{REF}'$ corresponding to SYTs of x20 and x21 after the bus reset occurs, and sends the dummy reproduction reference clock signal $C_{REF}'$ to a selection circuit 44, which then changes the clock signal from reproduction reference clock signal $C_{REF}$ from the match detection circuit 34 to the dummy reproduction reference clock signal $C_{REF}'$ from the dummy reproduction reference clock signal $C_{REF}'$ generation circuit 43 in response to the bus reset signal, and supplies the dummy reproduction reference clock signal $C_{REF}'$ to a PLL circuit 37.

After completion of processing of the data stored before the bus reset, again the reproduction reference clock signal $C_{REF}$ from the match detection circuit 34 is output to the PLL circuit 37.

The SYTs stored before the bus reset are deleted as described later.

Thus, in the second method of the fifth embodiment, after the bus reset, the data stored before the bus reset is processed using dummy reference clock and after all the data stored before the bus reset has been processed, processing is performed using reference clock after the bus reset.

Figure 30:
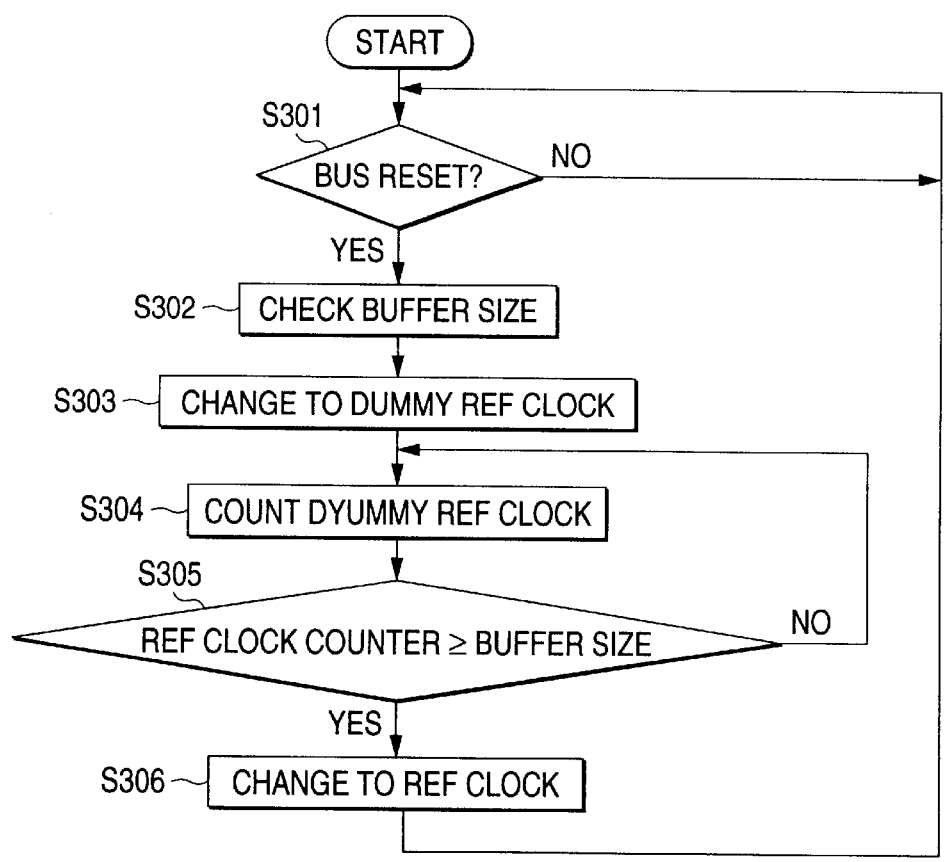
FIG. 30 is a flowchart to show the second method of the fifth embodiment of the invention.
Figure 31:
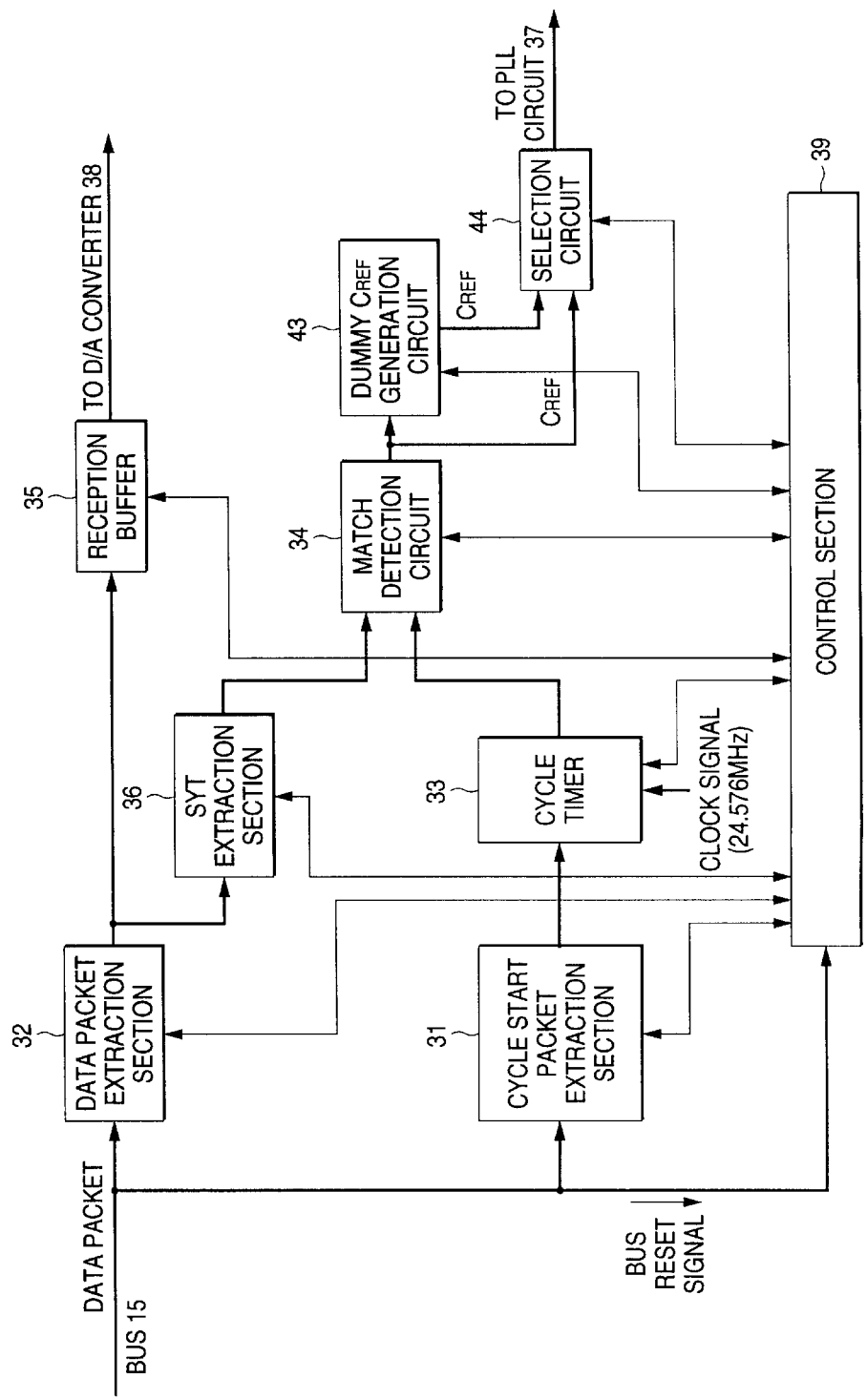
FIG. 31 is a block diagram to show the second method of the fifth embodiment of the invention.

FIG. 30 is a flowchart to show the receiver state described above. FIG. 31 is a block diagram provided by extracting the portion related to the fifth embodiment from the block diagram of FIG. 11. Circuit parts identical with those previously described with reference to FIG. 11 are denoted by the same reference numerals in FIG. 31 and will not be discussed again.

The fifth embodiment further includes the dummy reproduction reference clock signal $C_{REF}'$ generation circuit 43 and the selection circuit 44.

The dummy reproduction reference clock signal $C_{REF}'$ generation circuit 43 receives a reproduction reference clock signal $C_{REF}$ from the match detection circuit 34, generates a dummy reproduction reference clock signal $C_{REF}'$ by a method described later from the reproduction reference clock signal $C_{REF}$, and supplies the dummy reproduction reference clock signal $C_{REF}'$ to the selection circuit 44.

The selection circuit 44 selectively supplies the reproduction reference clock signal $C_{REF}$ from the match detection circuit 34 or the dummy reproduction reference clock signal $C_{REF}'$ from the dummy reproduction reference clock signal $C_{REF}'$ generation circuit 43 to the PLL circuit 37.

The second method of the fifth embodiment will be discussed specifically with reference to FIGS. 30 and 31.

First, in a state in which usual operation is performed as previously described in the second embodiment, if bus reset occurs at step S301 because of connection of a new machine or disconnection of an existing machine, the control section 39 receives a bus reset signal. After this, the control section 39 sends a control signal to the SYT extraction section 36 so as to check Buffer Size in the buffer.

Upon reception of the control signal, the SYT extraction section 36 checks Buffer Size in the buffer and returns the Buffer Size to the control section 39 at step S302.

After this, all SYTs in the buffer are deleted.

The Buffer Size is the same as that previously described in the first method.

The control section 39 also sends a change signal to the selection circuit 44.

Upon reception of the change signal, the selection circuit 44 changes the reproduction reference clock signal to be supplied to the PLL circuit 37 to the dummy reproduction reference clock signal $C_{REF}'$ from the dummy reproduction reference clock signal $C_{REF}'$ generation circuit 43 at step S303.

At this time, the match detection circuit 34, to which SYT after the bus reset is supplied, does not output for a while. Therefore, during the time, the dummy reproduction reference clock signal $C_{REF}'$ from the dummy reproduction reference clock signal $C_{REF}'$ generation circuit 43 is supplied to the selection circuit 44.

The control section 39 counts the number of the rising edges of the dummy reproduction reference clock signal $C_{REF}'$ supplied to the selection circuit 44 at step S304. If the count becomes equal to or greater than the Buffer Size at step S305, the control section 39 transmits a change signal to the selection circuit 44.

Upon reception of the change signal, the selection circuit 44 again changes the reproduction reference clock signal to be supplied to the PLL circuit 37 to the normal reproduction reference clock signal $C_{REF}$ at step S306.

On the other hand, if the count of the rising edges of the dummy reproduction reference clock signal $C_{REF}'$ does not become equal to or greater than the Buffer Size at step S305, control goes to step S304 and counting the number of the rising edges of the dummy reproduction reference clock signal $C_{REF}'$ is continued.

After usual reproduction processing is performed at step S306, whether or not bus reset occurs is checked.

If bus reset does not occur at step S301, the usual operation is repeated until bus reset occurs.

Thus, in the second method of the fifth embodiment, a dummy reproduction reference clock signal $C_{REF}'$ is generated after the bus reset, the data stored before the bus reset is processed using the dummy reproduction reference clock signal $C_{REF}'$, and after all the data stored before the bus reset has been processed, processing is performed using the reproduction reference clock signal $C_{REF}$ after the bus reset. Therefore, even if the time information before the bus reset differs from that after the bus reset, normal processing is performed.

The specific generation method of the dummy reproduction reference clock signal $C_{REF}'$ is as follows:

In FIG. 31, the dummy reproduction reference clock signal $C_{REF}'$ generation circuit 43 counts the rising edges of clock periods (FIG. 32) of reproduction reference clock signal $C_{REF}$ generated in the match detection circuit 34 and timings by a counter (not shown) and stores the clock period in a buffer (not shown) in the dummy reproduction reference clock signal $C_{REF}'$ generation circuit 43.

Figure 32:
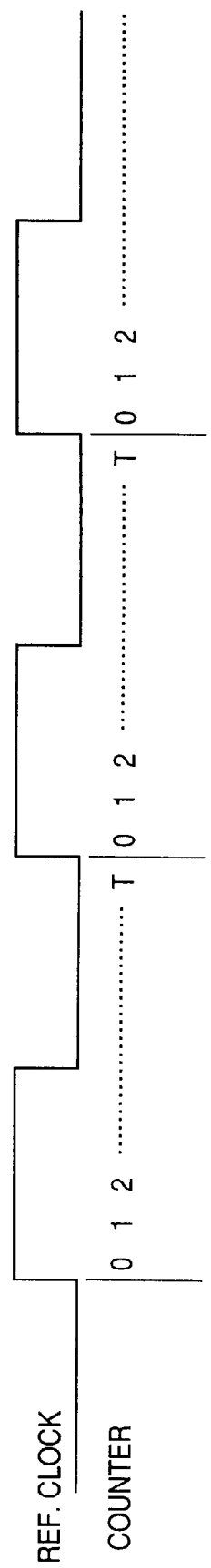
FIG. 32 is a drawing to show clock period of reproduction reference clock signal $C_{REF}$ in the second method of the fifth embodiment of the invention.

In the example shown in FIG. 32, the clock period (T) is stored in the buffer.

Since the counter value is stored in the buffer on the rising edge of the reference clock and then the next period (T) is counted, the counter is adapted to clear the count and again continue the count operation.

When bus reset occurs in the above-described state, the dummy reproduction reference clock signal $C_{REF}'$ generation circuit 43 generates a dummy reproduction reference clock signal $C_{REF}'$ based on the period stored in the buffer, such as the period (T), and supplies the dummy reproduction reference clock signal $C_{REF}'$ to the selection circuit 44.

The dummy reproduction reference clock signal $C_{REF}'$ is thus generated.

In the second method of the fifth embodiment, the selection circuit 44 changes the reproduction reference clock signal to be supplied to the PLL circuit 37 based on Buffer Size in the buffer in the SYT extraction section 36, but it can also change the reproduction reference clock signal based on Buffer Size in the reception buffer 35. How to find the Buffer Size is not limited to that in the fifth embodiment; any other method may be adopted if the data amount in the buffer can be found. The SYT extraction section 36 determines whether each SYT is an SYT stored before or after bus reset as described later in the sixth embodiment of the invention, and the selection circuit 44 can also change based on the determination result.

As described above, in the first and second methods of the fifth embodiment, the data stored before the bus reset and that stored after the bus reset are processed normally without losing the data before and after the bus reset.

Sixth Embodiment: Receiver

FIGS. 33A and 33B are drawings to schematically show the method of (5) described above.

The buffer state in an SYT extraction section 36 in FIGS. 33A and 33B is the same as that in the second embodiment.

FIG. 33A shows the state of a buffer in the SYT extraction section 36 just after bus reset in a receiving party operating at cycle time CT=X and FIG. 33B shows the buffer state after the method (5) is executed.

That is, since transmission and reception are executed at cycle time CT=X before bus reset, SYTs of x20, x21, and x22 are stored in the buffer in the SYT extraction section 36 (FIG. 33A).

After this, if bus reset occurs and the cycle time on the bus becomes CT=Y, the SYT extraction section 36 inputs new SYT as usual.

After input of new SYTs, SYTs at cycle time CT=X and SYTs at cycle time CT=Y are stored as x20, x21, and x22 and y0, y1, y2, y3 . . . in the buffer in the SYT extraction section 36 (FIG. 33B).

A difference between the preceding and following SYTs is calculated in the buffer and whether each SYT is an SYT stored before or after bus reset is determined according to the difference. Based on the determination result, demodulation processing is performed at cycle time CT=X for the data stored before bus reset; demodulation processing is performed at cycle time CT=Y for the data stored after bus reset.

Thus, in the sixth embodiment, demodulation processing is performed at cycle time CT=X for the data stored before bus reset and demodulation processing is performed at cycle time CT=Y for the data stored after bus reset.

Figure 35:
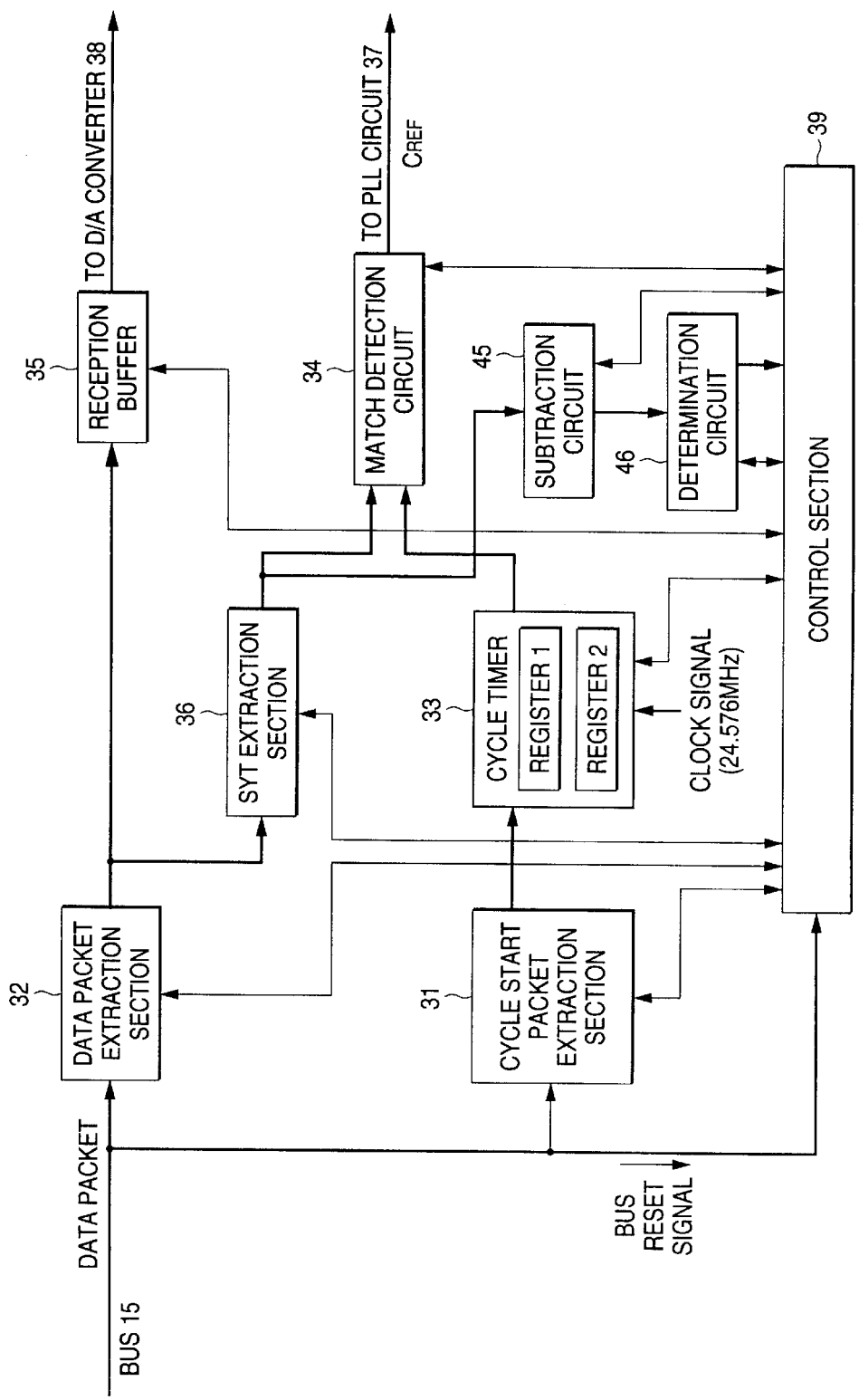
FIG. 35 is a block diagram of the sixth embodiment of the invention.

FIG. 34 is a flowchart to show the receiver state described above. FIG. 35 is a block diagram provided by extracting the portion related to the sixth embodiment from the block diagram of FIG. 11. Circuit parts identical with those previously described with reference to FIG. 11 are denoted by the same reference numerals in FIG. 35 and will not be discussed again.

The sixth embodiment further includes a subtraction circuit 45 and a determination circuit 46. A cycle timer 33 has two registers for temporarily retaining data.

The subtraction circuit 45 receives SYTs from the SYT extraction section 36, calculates a difference between the preceding and following SYTs according to a calculation expression described later, and supplies the time difference to the determination circuit 46 as the time difference (D).

The determination circuit 46 receives the time difference (D) from the substraction circuit 45, determines whether each SYT is an SYT stored before or after bus reset by a method described later based on the time difference (D), and supplies the determination result to a control section 39.

The specific method of the sixth embodiment will be discussed with reference to FIGS. 34 and 35.

First, in a state in which data is transmitted and received on a bus 15 by at least two nodes, a cycle start packet extraction section 31 extracts a data packet from the bus 15 and supplies extracted cycle start packet CS to the cycle timer 33, which then sets the cycle time indicated in the cycle start packet CS in a register 1, for example, generates cycle time of the home machine based on the setup cycle time, and supplies the generated cycle time to a match detection circuit 34.

On the other hand, a data packet extraction section 32 extracts an isochronous packet on the bus 15 and feeds data in the packet into a reception buffer 35. The SYT extraction section 36 extracts SYT contained in a CIP header in the isochronous packet.

The SYT extraction section 36 supplies the SYT contained in the CIP header in the isochronous packet to the match detection circuit 34 and the substraction circuit 45.

The subtraction circuit 45 calculates a time difference (D) between the extracted SYTs according to the calculation expression described later, and supplies the time difference (D) to the determination circuit 46.

The determination circuit 46 receives the time difference (D) from the substraction circuit 45, determines whether the SYT is an SYT stored before or after bus reset by the method described later based on the time difference (D), and supplies the determination result to the control section 39.

After this, data demodulation processing is performed in data reception processing described above.

If bus reset occurs at step S341 because of connection of a new machine or disconnection of an existing machine while data is being transferred, the control section 39 receives a bus reset signal. After this, the control section 39 transmits a control signal to the cycle timer 33 for instructing the cycle timer 33 to store a new cycle time in another register. Upon reception of the control signal, the cycle timer 33 writes a new cycle time into a second register 2, for example.

At this time, the cycle timer 33 generates the cycle time of the home machine based on the cycle time stored in the register 1 and continues to supply the value of the generated cycle time to the match detection circuit 34.

The match detection circuit 34 uses the cycle time from the cycle timer 33 and SYT supplied from the SYT extraction section 36 to generate a reproduction reference clock signal $C_{REF}$.

On the other hand, the subtraction circuit 45 receives SYTs from the SYT extraction section 36, calculates a time difference between the received SYTs, and transmits the time difference to the determination circuit 46 at step S342.

The determination circuit 46 stores the time difference supplied from the subtraction circuit 45 and compares the time difference with the preceding time difference to determine whether or not the difference value between the time differences is within a predetermined range described later at step S343. If the value is within the predetermined range, usual processing is continued.

On the other hand, if the value is outside the predetermined range, the determination circuit 46 transmits a control signal to the control section 39.

Upon reception of the control signal, the control section 39 transmits a control signal to the cycle timer 33 for instructing the cycle timer 33 to rewrite cycle time. Upon reception of the control signal, the cycle timer 33 rewrites the cycle time stored in the register 2 into the register 1 at step S344, generates the cycle time of the home machine based on the cycle time, and supplies the generated cycle time to the match detection circuit 34.

After the cycle time rewrite is executed at step S344, usual operation is repeated until bus reset occurs.

If bus reset does not occur at step S341, usual operation is also repeated until bus reset occurs.

Thus, in the sixth embodiment, two or more cycle time registers for reflecting the cycle times before and after bus reset are provided in the receiving party. After the bus reset, the data stored before the bus reset is processed using the cycle time before the bus reset and after the data stored before the bus reset has been all processed, usual processing is performed using the cycle time after the bus reset, so that data demodulation is executed without losing data.

The specific calculation method of the subtraction circuit 45 for calculating the time difference (D) between SYTs and the determination method of the determination circuit 46 are as follows:

The SYTs shown in FIG. 33B are supplied from the SYT subtraction section 36 to the subtraction circuit 45, which then uses the SYTs to calculate the time difference (D) as $$\text{time difference (D)} = \text{current SYT} - \text{immediately preceding SYT} \quad (8)$$

and supplies the time difference (D) to the determination circuit 46.

The determination circuit 46 detects the boundary between the SYT before bus reset and that after bus reset based on the time difference (D) and transmits the detection result to the control section 39. That is, the time difference (D') between the SYTs preceding and following the boundary differs from the time difference (D) between other SYTs, thus the SYTs between which the time difference (D') is found become the SYT before the bus reset and the SYT after the bus reset.

More specifically, in FIG. 33B, the subtraction circuit 45 calculates the time difference (D) as $$\text{time difference } (D) = x21 - x20 \quad (9)$$
$$= a$$

next, $$\text{time difference } (D) = x22 - x21 \quad (10)$$
$$= a$$

next, $$\text{time difference } (D) = y0 - x22 \quad (11)$$
$$= b$$

At this time, the calculation results of (Expression 9) and (Expression 10) on the SYTs added when cycle time CT=X are each predetermined time difference (a). Just after bus reset, calculation is executed on SYT added when cycle time CT=X and SYT added when cycle time CT=Y. Thus, if the reference time before the bus reset differs from that after the bus reset, predetermined time difference (b) results. Therefore, the above-described boundary is detected by comparing the time difference values. In the example, the predetermined time difference calculated on the SYTs added when cycle time CT=X is (a); in fact, however, the time difference also contains a little jitter component a and therefore if it is compared with any other time difference, it is advisable to adopt a±α.

The SYT before the bus reset and that after the bus reset are thus determined.

In the sixth embodiment, register change in the cycle timer 33 is made based on the determination result of the determination circuit 46, but it can also be made based on Buffer Size in either or both of the SYT extraction section 36 and the reception buffer as described above.

As described above, in the second to sixth embodiments of the invention, digital data sent by a transmitting party can be restored to a state in which it can be reproduced immediately at proper timing in a receiving party.

Thus, in the invention, when the reference time is changed as bus reset occurs, the transmitter or the receiver can deal with trouble caused by the reference time lag, so that all the problems are solved.

For example, audio data b in FIG. 14N already undergoes conversion to a packet before bus reset, thus cannot be handled in the transmitter, but can be corrected in the receiver.

Thus, it is advisable to provide a unit with both the transmitter and receiver methods if the unit can transmit and receive data. In this case, a cycle timer can be used for both the methods and the circuitry can be simplified.

In the invention, the time at which the reference time on the transmission bus changes is the time at which bus reset occurs. However, if bus reset does not occur, for example, when the cycle master node changes the reference time, the methods of the invention can be applied.

Although the non-blocking transfer method (in which conversion to a packet is executed in one Iso cycle unit), one of transmission methods defined in the A&M protocol, has been described, but the invention can also be applied to a blocking transfer method (in which conversion to a packet is executed in a predetermined number of sample units). It can also be applied at any other sampling frequency than 32 KHz.

In the embodiments, predetermined data is reproduced by the reception interface circuit 12, 13 according to the invention; the data to be reproduced may be video data or voice data. In the embodiments, the operation performed when the reception interface circuit 12, 13 is adopted for the transmission system complying with the IEEE1394-1995 standard has been described, but applicable transmission systems are not limited to those complying with the IEEE1394-1995 standard.

In short, the invention may be applied to a transmission interface unit in such a transmission system wherein time series data such as voice data or video data is divided into data groups and a data packet comprising reproduction specification time data (specifying the time at which each data piece in the data groups should be reproduced in a receiving party) added to the data groups is transmitted in a time division manner.

As described above, according to the invention, digital data sent by a transmitting party can be restored to a state in which it can be reproduced immediately at proper timing in a receiving party.

What is claimed is:

1. A transmission interface unit in a transmission system wherein time series data is divided into data groups and a data packet comprising reproduction specification time data, said reproduction specification time data specifying the time at which each data piece in the data groups should be reproduced is added to each data packet, is transmitted on a transmission bus in a time division manner, said transmission interface unit comprising:

a cycle timer for counting a reference time of a home machine based on a reference time on the transmission bus;

generation means for generating the reproduction specification time data;

addition means for dividing the time series data into data groups, putting into packets, and adding the reproduction specification time data to the data in the packets; and rewrite means for rewriting the reproduction specification time data generated by the generation means when the reference time on the transmission bus changes.

2. The transmission interface unit as claimed in claim 1 further comprising determination means for determining whether the reproduction specification time data generated by said generation means is reproduction specification time data generated before or after the reference time on the transmission bus changes and supplying the reproduction specification time data generated before the reference time on the transmission bus changes to said rewrite means based on the determination result.

3. The transmission interface unit as claimed in claim 1, wherein the cycle timer comprises at least two registers each for temporarily retaining the reference time on the transmission bus, at least the reference time of the home machine set before the reference time on the transmission bus changes and the reference time of the home machine set after the reference time on the transmission bus changes are retained in the registers, when the reference time on the transmission bus changes, the cycle timer calculates a difference between the reference times retained in the registers and transmits the difference to said rewrite means, and said rewrite means rewrites the reproduction specification time data based on the difference.

4. The transmission interface unit as claimed in claim 2, wherein said determination means and said rewrite means process the data in the packets that are output from the addition means.

5. A transmission interface unit in a transmission system wherein time series data is divided into data groups and a data packet comprising reproduction specification time data, said reproduction specification time data specifying the time at which each data piece in the data groups should be reproduced is added to each data packet, is transmitted on a transmission bus in a time division manner, said transmission interface unit comprising:

a cycle timer for counting a reference time of a home machine based on a reference time on the transmission bus;

a generation section for generating the reproduction specification time data;

an addition section for dividing the time series data into data groups, putting into packets, and adding the reproduction specification time data to the data in the packets; and a rewrite section for rewriting the reproduction specification time data generated by the generation section when the reference time on the transmission bus changes.

6. The transmission interface unit as claimed in claim 5 further comprising a determination section for determining whether the reproduction specification time data generated by said generation section is reproduction specification time data generated before or after the reference time on the transmission bus changes and supplying the reproduction specification time data generated before the reference time on the transmission bus changes to said rewrite section based on the determination result.

7. The transmission interface unit as claimed in claim 5, wherein the cycle timer comprises at least two registers each for temporarily retaining the reference time on the transmission bus, at least the reference time of the home machine set before the reference time on the transmission bus changes and the reference time of the home machine set after the reference time on the transmission bus changes are retained in the registers, when the reference time on the transmission bus changes, the cycle timer calculates a difference between the reference times retained in the registers and transmits the difference to said rewrite section, and said rewrite section rewrites the reproduction specification time data based on the difference.

8. The transmission interface unit as claimed in claim 6, wherein said determination section and said rewrite section process the data in the packets that are outputted from the addition section.

9. A transmission interface unit in a transmission system wherein time series data is divided into data groups and a data packet comprising reproduction specification time data, said reproduction specification time data specifying the time at which each data piece in the data groups should be reproduced is added to each data packet, is transmitted on a transmission bus in a time division manner, said transmission interface unit comprising:

a cycle timer for counting a reference time of a home machine based on a reference time on the transmission bus; and a controller for controlling:

generation of the reproduction specification time data;

division of the time series data into data groups, placement into packets, and addition of the reproduction specification time data to the data in the packets; and rewriting of the generated reproduction specification time data when the reference time on the transmission bus changes.

10. The transmission interface unit as claimed in claim 9, wherein said controller further controls determining whether the generated reproduction specification time data is reproduction specification time data generated before or after the reference time on the transmission bus changes and rewriting the reproduction specification time data generated before the reference time on the transmission bus changes based on the determination result.

11. The transmission interface unit as claimed in claim 9, wherein the cycle timer comprises at least two registers each for temporarily retaining the reference time on the transmission bus, at least the reference time of the home machine set before the reference time on the transmission bus changes and the reference time of the home machine set after the reference time on the transmission bus changes are retained in the registers, when the reference time on the transmission bus changes, the cycle timer calculates a difference between the reference times retained in the registers and transmits the difference to said controller, and said controller controls the rewriting of the reproduction specification time data based on the difference.

12. The transmission interface unit as claimed in claim 10, wherein said controller controls the determining, the supplying and the rewriting of the data in the packets after the addition of the reproduction specification time data to the data in the packets.

* * * * *